(12) United States Patent
Van Olst et al.

(10) Patent No.: US 9,986,150 B2
(45) Date of Patent: May 29, 2018

(54) ALGORITHM TO ESTIMATE YAW ERRORS IN CAMERA POSE

(71) Applicants: Daniel G Van Olst, Menlo Park, CA (US); Kathrin Berkner, Los Altos, CA (US); Ramya Narasimha, Palo Alto, CA (US)

(72) Inventors: Daniel G Van Olst, Menlo Park, CA (US); Kathrin Berkner, Los Altos, CA (US); Ramya Narasimha, Palo Alto, CA (US)

(73) Assignee: Ricoh Co., Ltd., Tokyo (JP)

( * ) Notice: Subject to any disclaimer, the term of this patent is extended or adjusted under 35 U.S.C. 154(b) by 242 days.

(21) Appl. No.: 15/010,620

(22) Filed: Jan. 29, 2016

(65) Prior Publication Data

US 2017/0094158 A1    Mar. 30, 2017

Related U.S. Application Data

(60) Provisional application No. 62/234,804, filed on Sep. 30, 2015.

(51) Int. Cl.
*H04N 5/232* (2006.01)
*G06T 3/00* (2006.01)
(Continued)

(52) U.S. Cl.
CPC ....... *H04N 5/23219* (2013.01); *G06T 3/0006* (2013.01); *G06T 3/4038* (2013.01);
(Continued)

(58) Field of Classification Search
CPC ....... G06T 2200/24; G06T 2207/30244; G06T 3/0006; G06T 3/4038; G06T 7/73;
(Continued)

(56) References Cited

U.S. PATENT DOCUMENTS

| 7,893,963 B2 * | 2/2011 | Gallagher | H04N 5/23248 348/208.6 |
|---|---|---|---|
| 2002/0080242 A1 * | 6/2002 | Takahashi | H04N 5/217 348/207.99 |

(Continued)

FOREIGN PATENT DOCUMENTS

| EP | 3046070 A1 | 7/2016 |
|---|---|---|
| JP | 2002-057879 A | 2/2002 |

(Continued)

OTHER PUBLICATIONS

European Search Report for EP Application No. 16189111.4-1906/3151199, dated Mar. 22, 2017, 10 pages.
(Continued)

*Primary Examiner* — Peter D Le
(74) *Attorney, Agent, or Firm* — Patent Law Works LLP

(57) ABSTRACT

A system and method that calculates a yaw error in an image and provides a user interface to a user for correcting the yaw error. The method includes receiving an image, performing line detection in the image, computing a line parameterization for lines in the image, computing a yaw angle for the image and providing the yaw data calculated in the image.

19 Claims, 37 Drawing Sheets

(51) Int. Cl.
*G06T 3/40* (2006.01)
*G06T 7/73* (2017.01)

(52) U.S. Cl.
CPC ............ *G06T 7/73* (2017.01); *H04N 5/23222* (2013.01); *H04N 5/23238* (2013.01); *H04N 5/23293* (2013.01); *G06T 2200/24* (2013.01); *G06T 2207/30244* (2013.01)

(58) Field of Classification Search
CPC ........... H04N 5/23219; H04N 5/23222; H04N 5/23238; H04N 5/23293
See application file for complete search history.

(56) References Cited

U.S. PATENT DOCUMENTS

| | | | |
|---|---|---|---|
| 2003/0227555 A1* | 12/2003 | Kobayashi | G08B 13/1963 348/231.6 |
| 2004/0183898 A1 | 9/2004 | Endo et al. | |
| 2005/0078178 A1* | 4/2005 | Brown | H04N 7/181 348/139 |
| 2005/0261573 A1* | 11/2005 | Satoh | G06K 9/3208 600/415 |
| 2006/0203090 A1* | 9/2006 | Wang | G06K 9/209 348/143 |
| 2006/0291698 A1* | 12/2006 | Oizumi | G06T 5/006 382/104 |
| 2006/0291744 A1* | 12/2006 | Ikeda | G06T 3/00 382/275 |
| 2008/0075358 A1* | 3/2008 | Yu | G06T 7/80 382/154 |
| 2010/0033567 A1* | 2/2010 | Gupta | G08B 13/1963 348/143 |
| 2010/0066810 A1 | 3/2010 | Ryu et al. | |
| 2010/0225773 A1* | 9/2010 | Lee | H04N 5/232 348/222.1 |
| 2010/0245603 A1* | 9/2010 | Hashi | G03B 5/00 348/208.5 |
| 2010/0293502 A1* | 11/2010 | Kang | G06F 1/1626 715/803 |
| 2010/0295948 A1* | 11/2010 | Xie | G06T 7/0018 348/175 |
| 2011/0052139 A1* | 3/2011 | Oku | H04N 5/23293 386/224 |
| 2011/0157396 A1* | 6/2011 | Kotani | H04N 5/232 348/222.1 |
| 2011/0234750 A1 | 9/2011 | Lai et al. | |
| 2012/0033100 A1* | 2/2012 | Harikae | H04N 1/00307 348/223.1 |
| 2012/0202515 A1 | 8/2012 | Hsu et al. | |
| 2012/0249846 A1* | 10/2012 | Nishio | H01L 27/14603 348/294 |
| 2013/0050407 A1 | 2/2013 | Brinda et al. | |
| 2013/0201377 A1* | 8/2013 | Showering | H04N 5/23258 348/333.02 |
| 2014/0003729 A1 | 1/2014 | Auclair et al. | |
| 2014/0375762 A1* | 12/2014 | Ohki | H04N 5/23238 348/36 |
| 2015/0088703 A1 | 3/2015 | Yan | |
| 2015/0215532 A1 | 7/2015 | Jafarzadeh et al. | |
| 2015/0248591 A1 | 9/2015 | Shu et al. | |
| 2015/0281510 A1* | 10/2015 | Okuda | H04N 1/2369 358/1.13 |
| 2015/0293207 A1* | 10/2015 | Al Zanati | G01S 5/163 382/104 |
| 2015/0304652 A1* | 10/2015 | Spas | G01C 21/165 348/36 |
| 2015/0348329 A1* | 12/2015 | Carre | G06Q 30/02 345/633 |
| 2016/0217318 A1* | 7/2016 | Hayasaka | G06T 3/60 |
| 2017/0046868 A1* | 2/2017 | Chernov | G06T 7/73 |

FOREIGN PATENT DOCUMENTS

| | | |
|---|---|---|
| JP | 2008-003394 A | 1/2008 |
| JP | 2013-168843 A | 8/2013 |
| WO | WO2015114621 A1 | 8/2015 |

OTHER PUBLICATIONS

Richard O. Duda and Peter E. Hart "Use of the Hough Transformation to Detect Lines and Curves in Pictures" dated 1972, 5 pages, Communications of the ACM.

Markus Von Ehr R. Dillmann "Construction of a Mobile Robot for Surface Inspection" dated 2000, 3 pages, Institute for Process Control & Robotics University of Karlsruhe, Department for Computer Science 76128 Karlsruhe, Germany.

Assem Agarwala, et al. "Photographing Long Scenes with Multi-Viewpoint Panoramas" dated 2006, 9 pages, University of Washington, University of California, Berkeley, Microsoft Research and Adobe Systems.

Matthew Brown et al. "Automatic Panoramic Image Stitching Using Invariant Features" dated Dec. 2006, 16 pages, International Journal of Computer Vision 2007 Springer Science + Media, LLC Manufactured in the United States.

Marketa Dubska, et al. PClines—Line Detection Using Parallel Coordinates, dated Jun. 20, 2011, 6 pages, Graph@FIT Brno University of Technology Bozetechova 2, Brno.

Brad Larson "BradLarson/CPUImage" dated Dec. 3, 2015, retrieved at https://github.com/BradLarson/GPUImage/blob/master/README.md# retrieved on Jun. 28, 2016, 24 pages.

Gul Varol et al. "Rafta Urun Diziliminin Goruntu Isleme ile Tespiti Product Placement Detection Based on Image Processing", dated 2014, 4 pages, 2014 IEEE 22nd Signal Processing and Communications Applications Conference (SIU 2014).

European Search Report for EP Application No. 16188875.5-1906/3151198, dated Mar. 29, 2017, 9 pages.

\* cited by examiner

… (1) …

ALGORITHM TO ESTIMATE YAW ERRORS IN CAMERA POSE

CROSS REFERENCE TO RELATED APPLICATIONS

The present application claims priority, under 35 U.S.C. § 119, to U.S. Provisional Patent Application No. 62/234,804, filed Sep. 30, 2015 entitled "Camera Pose Yaw Error Determination and Use in a Yaw User Interface," which is incorporated by reference in its entirety.

BACKGROUND

Field of the Invention

The specification generally relates to providing a user interface for guiding the user to capture a series of images to create a single linear panoramic image. In particular, the specification relates to a system and method for generating one or more user interface elements that provide instantaneous feedback to guide the user in capturing the series of images to create the single linear panoramic image. More particularly, the specification relates to camera pose yaw error determination and use of the error in a user interface.

Description of the Background Art

A planogram is a visual representation of products in a retail environment. For example, a planogram may describe where in the retail environment and in what quantity products should be located. Such planograms are known to be effective tools for increasing sales, managing inventory and otherwise ensuring that the desired quantity and sizes of an item are placed to optimize profits or other parameters. However, presentation and maintenance of adequate levels of stock on shelves, racks and display stands is a labor-intensive effort, thereby making enforcement of planograms difficult. While the location and quantity of products in retail stores can be manually tracked by a user, attempts are being made to automatically recognize the products and automatically or semi-automatically obtain information about the state of products.

When an image is captured for a planogram, if a tilt error is present in the image, distortion will be introduced into the planogram. Most systems do not include internal accelerometers to detect a yaw error tilt. Furthermore, previous attempts at using existing internal accelerometers to detect a yaw error tilt in a captured image have been unsuccessful. For every angle of yaw rotation, internal accelerometers report the same value, resulting in images for planograms with yaw error rotation.

Previous attempts at recognizing products have deficiencies. For example, one method to achieve the goal of recognizing multiple products from multiple images is through image stitching. Unfortunately, existing image stitching techniques can lead to artifacts and can interfere with the optimal operation of recognition.

SUMMARY

The techniques introduced herein overcome the deficiencies and limitations of the prior art, at least in part, with a system and method for camera pose error determination and use in a yaw user interface. In one embodiment, a system and method for camera yaw error determination includes receiving a first preview image of an object; computing a yaw angle for the first preview image; determining a yaw indicator based on the yaw angle; and presenting the yaw indicator over the first preview image on a portion of a display device.

In another embodiment, a system and method for using a yaw angle in a user interface comprises receiving a preview image of a shelf, performing line detection in the preview image, computing a line parameterization to detect at least two lines in the preview image, computing a yaw angle for the preview image using the line parameterization, determining a vertical eyelid indicator based on the yaw angle, and presenting the vertical eyelid indicator over a portion of a smaller concentric circle on a display device.

In another embodiment, a system and method for camera yaw error determination includes receiving a preview image of an object; determining a first line and a second line in the preview image of the object; determining a first height between the first line and the second line at a first point in the preview image; determining a second height between the first line and the second line at a second point in the preview image; parameterizing the first line and the second line; calculating a first distance from a capture device point to the first point; calculating a second distance from the capture device point to the second point; calculating a yaw angle using the parameterization of the first line, the parameterization of the second line, the first distance, and the second distance; and correcting the preview image of the object using the yaw angle.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
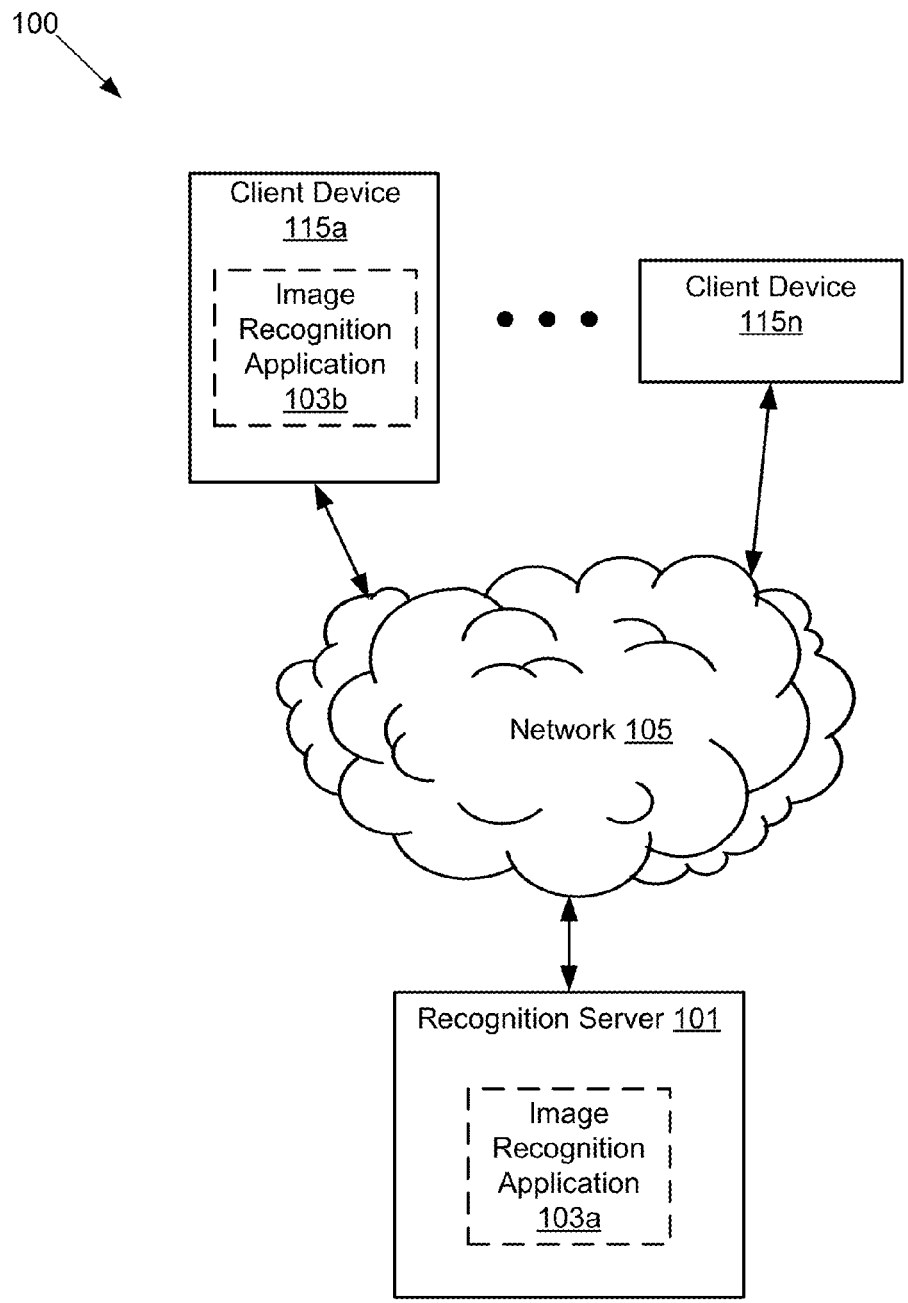
FIG. 1 shows a high-level block diagram illustrating one embodiment of a system for capturing a series of images to create a linear panorama.

FIG. 1 shows a high-level block diagram illustrating one embodiment of a system 100 for capturing a series of images to create a linear panorama. The illustrated system 100 may have one or more client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In some embodiments, the system 100 includes a recognition server 101 coupled to the network 105. In some embodiments, the recognition server 101 may be either a hardware server, a software server, or a combination of software and hardware. The recognition server 101 may be, or may be implemented by, a computing device including a processor, a memory, applications, a database, and network communication capabilities. In the example of FIG. 1, the components of the recognition server 101 are configured to implement an image recognition application 103a described in more detail below. In one embodiment, the recognition server 101 provides services to a consumer packaged goods firm for identifying products on shelves, racks, or displays. While the examples herein describe recognition of products in an image of shelves, such as a retail display, it should be understood that the image may include any arrangement of organized objects. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images to and from the client device 115. The images received by the recognition server 101 can include an image captured by the client device 115, an image copied from a website or an email, or an image from any other source. Although only a single recognition server 101 is shown in FIG. 1, it should be understood that there may be any number of recognition servers 101 or a server cluster. The recognition server 101 also includes a data storage 243, which is described below in more detail with reference to FIG. 2.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends a query image to the recognition server 101 and the recognition server 101 provides data in JSON (JavaScript Object Notation) format about one or more objects recognized in the query image to the client device 115.

The image recognition application 103 may include software and/or logic to provide the functionality for capturing a series of images to create a linear panorama. In some embodiments, the image recognition application 103 can be implemented using programmable or specialized hardware, such as a field-programmable gate array (FPGA) or an application-specific integrated circuit (ASIC). In some embodiments, the image recognition application 103 can be implemented using a combination of hardware and software. In other embodiments, the image recognition application 103 may be stored and executed on a combination of the client devices 115 and the recognition server 101, or by any one of the client devices 115 or recognition server 101.

In some embodiments, the image recognition application 103b acts as a thin-client application with some functionality executed on the client device 115 and additional functionality executed on the recognition server 101 by image recognition application 103a. For example, the image recognition application 103b on the client device 115 could include software and/or logic for capturing the image, transmitting the image to the recognition server 101, and displaying image recognition results. A thin-client application 103b may include further functionality described herein with reference to image recognition application 103, such as, processing the image and performing feature identification.

In some embodiments, the image recognition application 103 receives an image of a portion of an object of interest from a capture device 247. The image recognition application 103 determines features of the image. The image recognition application 103 generates a user interface including a current pre view image of the object of interest on a display of the capture device 247. The image recognition application 103 dynamically compares the features of the image with the current preview image of the object of interest to determine overlap. The image recognition application 103 updates the user interface to include a visually distinct indicator to guide a movement of the capture device 247 to produce the desired or prescribed overlap and alignment between the images. The image recognition application 103 determines whether the overlap between the image and the current preview satisfies a predetermine overlap and alignment thresholds. For example, an overlap threshold can be set at 60 percent. The image recognition application 103 captures a next image of the portion of the object of interest based on the overlap satisfying the predetermined overlap threshold. The operation of the image recognition application 103 and the functions listed above are described below in more detail below.

Figure 2:
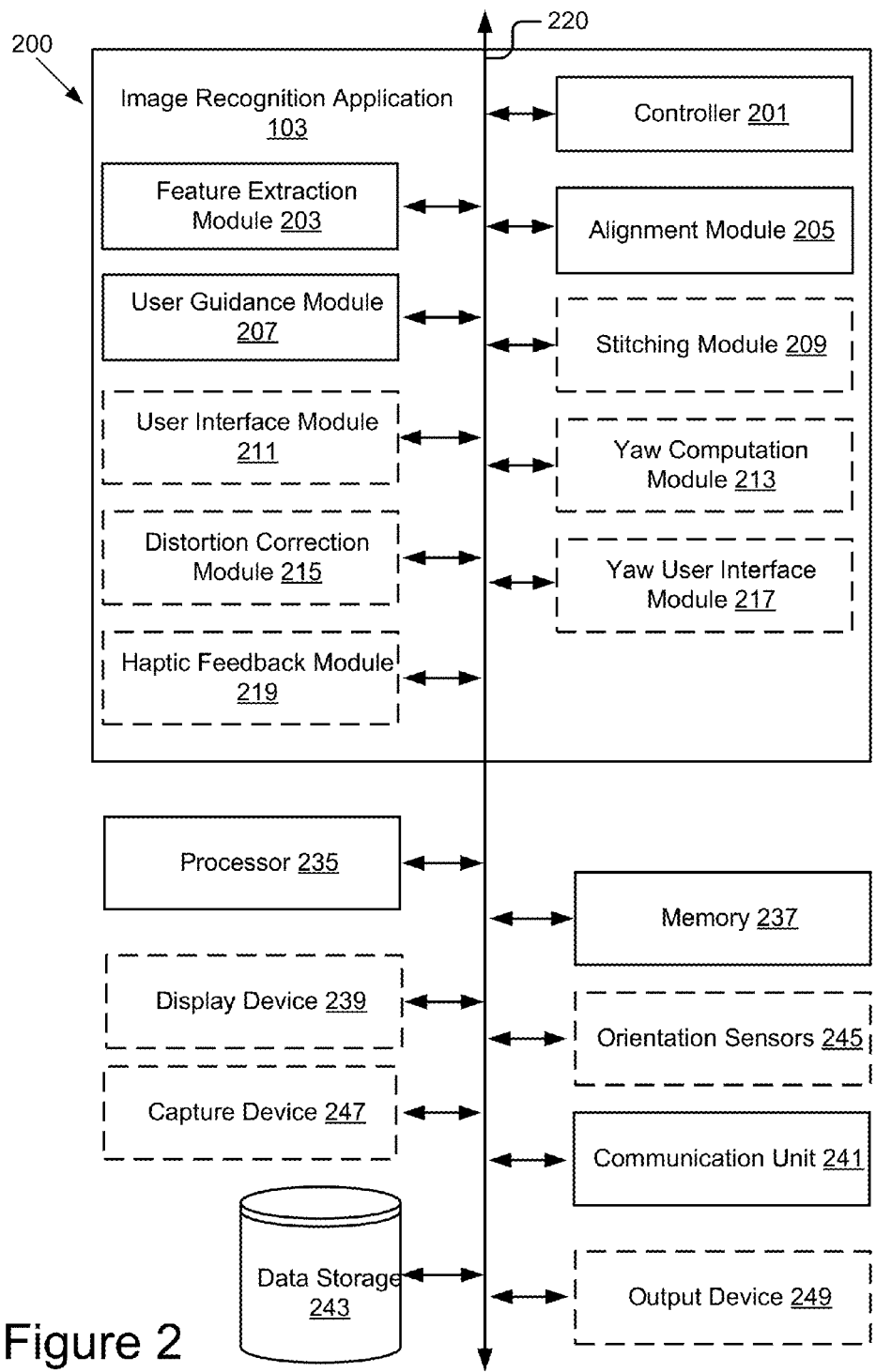
FIG. 2 shows a block diagram illustrating one embodiment of a computing device including an image recognition application.

FIG. 2 shows a block diagram illustrating one embodiment of a computing device 200 including an image recognition application 103. The computing device 200 may also include a processor 235, a memory 237, a communication unit 241, data storage 243, display device 239, orientation sensors 245, a capture device 247, and output device 249 according to some examples. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be the client device 115, the recognition server 101, or a combination of the client device 115 and the recognition server 101. In such embodiments where the computing device 200 is the client device 115 or the recognition server 101, it should be understood that the client device 115, and the recognition server 101 may include other components not shown in FIG. 2.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the image recognition application 103, and the data storage 243. It will be apparent to one skilled in the art that other processors, operating systems, sensors, displays and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the image recognition application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-Ray™, etc.). It should be understood that the memory 237 may be a single device or may include multiple types of devices and configurations.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image. The communication unit 241 also transmits information including recognition results to the client device 115 for display, for example, in response to processing the image. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for analyzing a received image and results of the analysis and other functionality as described herein. For example, the data storage 243 may store an image overlap threshold for capturing optimal overlapping images. The data storage 243 may similarly store a captured image and the set of features determined for the captured image. Additionally, the data storage 243 may store a stitched linear panoramic image. The data stored in the data storage 243 is described below in more detail.

In the illustrated embodiment, the display device 239 may be a screen for displaying a preview image or a user interface. The display device 239 may be configured to connect to the processor 235 and data storage 243 view the bus 220 and receive information from the image recognition application 103. The display device 239 may be incorporated into a mobile phone, tablet, computer, camera, or other device capable of being configured with a display screen.

In the illustrated embodiment, the capture device 247 may be a device capable of capturing images of an object. The capture device 247 may be any device capable of capturing an image, including a camera, or similar device. The capture device 247 may be a stand-alone device or configured to be part of a client device 115. The capture device 247 may be configured to connect to the processor 235 and data storage 243 view the bus 220 and receive and send information from the image recognition application 103.

In the illustrated embodiment, the orientation sensors 245 may be sensors capable of detecting an orientation of a device. The sensors may be accelerometers, magnetometers or other sensors capable of detecting an orientation. The orientation sensors 245 may be incorporated internally into a client device 115 or separate from a client device 115. The orientation sensors 245 may be configured to send and receive information from the image recognition application 103 via the bus 220.

In the illustrated embodiment, the output device 249, may be any device capable of producing an output to a user. The output device 249 may be a speaker, an image presented on a user interface, a vibration on a client device 115 or another output that is capable of being detected by a user. In some embodiments, the output device 249 may be a cellular phone, tablet computer or other mobile device configured to provide haptic feedback, using the haptic feedback module 219, via vibration. In an alternative embodiment, the output device 249, may a smartwatch capable of providing a haptic feedback, using the haptic feedback module 219. In such an embodiment, the smartwatch may be capable of providing more sophisticated haptic feedback, such as providing a tap signature. The tap signature may be a special sequence of taps on a user's wrist to indicate something, such as a correct tilt on a device.

In some embodiments, the image recognition application 103 may include a controller 201, a stitching module 209, a user interface module 211, a feature extraction module 203, alignment module 205, user guidance module 207, yaw computation module 213, distortion correction module 215, yaw user interface module 217 and haptic feedback module 219. The components of the image recognition application 103 are communicatively coupled via the bus 220.

The controller 201 may include software and/or logic to control the operation of the other components of the image recognition application 103. The controller 201 controls the other components of the image recognition application 103 to perform the methods described below with reference to FIGS. 3-8. The controller 201 may also include software and/or logic to provide the functionality for handling communications between the image recognition application 103 and other components of the computing device 200 as well as between the components of the image recognition application 103. In some embodiments, the controller 201 can be implemented using programmable or specialized hardware including a field-programmable gate array (FPGA) or an application-specific integrated circuit (ASIC). In some embodiments, the controller 201 can be implemented using a combination of hardware and software executable by processor 235. In some embodiments, the controller 201 is a set of instructions executable by the processor 235. In some implementations, the controller 201 is stored in the memory 237 and is accessible and executable by the processor 235. In some implementations, the controller 201 is adapted for cooperation and communication with the processor 235, the memory 237 and other components of the image recognition application 103 via the bus 220.

In some embodiments, the controller 201 sends and receives data, via the communication unit 241, to and from one or more of the client device 115 and the recognition server 101. For example, the controller 201 receives, via the communication unit 241, an image from a client device 115 operated by a user and sends the image to the stitching module 209. In another example, the controller 201 receives data for providing a graphical user interface to a user from the user interface module 211 and sends the data to a client device 115, causing the client device 115 to present the user interface to the user.

In some embodiments, the controller 201 receives data from other components of the image recognition application 103 and stores the data in the data storage 243. For example, the controller 201 receives data including features identified for an image from the stitching module 209 and stores the data in the data storage 243. In other embodiments, the controller 201 retrieves data from the data storage 243 and sends the data to other components of the image recognition application 103. For example, the controller 201 retrieves data including an overlap threshold from the data storage 243 and sends the retrieved data to the stitching module 209.

The stitching module 209 may include software and/or logic to provide the functionality for capturing a series of images to stitch a single linear panoramic image. In some embodiments, the stitching module 209 can be implemented using programmable or specialized hardware including a field-programmable gate array (FPGA) or an application-specific integrated circuit (ASIC). In some embodiments, the stitching module 209 can be implemented using a combination of hardware and software executable by processor 235. In some embodiments, the stitching module 209 can perform the methods, implement the user interfaces, and other functions described below with reference to FIGS. 15-17, 20 and 26A-26E to stitch together an image. In some embodiments, the stitching module 209 is a set of instructions executable by the processor 235. In some implementations, the stitching module 209 is stored in the memory 237 and is accessible and executable by the processor 235. In some implementations, the stitching module 209 is adapted for cooperation and communication with the processor 235, the memory 237 and other components of the image recognition application 103 via the bus 220.

The user interface module 211 may include software and/or logic for providing user interfaces to a user. In some embodiments, the user interface module 211 can be implemented using programmable or specialized hardware including a field-programmable gate array (FPGA) or an application-specific integrated circuit (ASIC). In some embodiments, the user interface module 211 can be implemented using a combination of hardware and software executable by processor 235. In some embodiments, the user interface module 211 is a set of instructions executable by the processor 235. In some implementations, the user interface module 211 is stored in the memory 237 and is accessible and executable by the processor 235. In some implementations, the user interface module 211 is adapted for cooperation and communication with the processor 235, the memory 237 and other components of the image recognition application 103 via the bus 220.

In some embodiments, the user interface module 211 receives instructions from the stitching module 209 or other modules of the image recognition application 103 to generate a graphical user interface that instructs the user on how to move the client device 115 to capture a next image that has a good overlap with the previously captured image. In some embodiments, the user interface module 211 receives instructions from the stitching module 209 to generate a graphical user interface that guides the user to capture an overlapping image with little to no tilt in any of the axis of orientations (e.g., X, Y, or Z axis). In other embodiments, the user interface module 211 sends graphical user interface data to an application (e.g., a browser) in the client device 115 via the communication unit 241 causing the application to display the data as a graphical user interface. In some embodiments the user interface module 211 is capable of generating a yaw user interface instead of the yaw user interface module 217. In an alternative embodiment, the user interface module 211 may receive information from the yaw user interface module 217 to incorporate yaw data onto a user interface. Examples of these embodiments can be shown in FIGS. 26A-26E, 27, and 28.

The feature extraction module 203 may include software and/or logic to provide the functionality for analyzing a series of images to detect features of interest. In some embodiments, the feature extraction module 203 can be implemented using programmable or specialized hardware including a field-programmable gate array (FPGA) or an application-specific integrated circuit (ASIC). In some embodiments, the feature extraction module 203 can be implemented using a combination of hardware and software executable by processor 235. In some embodiments, the feature extraction module 203 is a set of instructions executable by the processor 235. In some implementations, the feature extraction module 203 is stored in the memory 237 and is accessible and executable by the processor 235. In some implementations, the feature extraction module 203 is adapted for cooperation and communications with the processor 235, the memory 237 and other components of the image recognition application 103 via the bus 220.

The alignment module 205 may include software and/or logic to provide the functionality for aligning a captured image with a previous image. In some embodiments, the alignment module 205 can be implemented using programmable or specialized hardware including a field-programmable gate array (FPGA) or an application-specific integrated circuit (ASIC). In some embodiments, the alignment module 205 can be implemented using a combination of hardware and software executable by processor 235. In some embodiments, the alignment module 205 is a set of instructions executable by the processor 235. In some implementations, the alignment module 205 is stored in the memory 237 and is accessible and executable by the processor 235. In some implementations, the alignment module 205 is adapted for cooperation and communications with the processor 235, the memory 237 and other components of the image recognition application 103 via the bus 220.

The user guidance module 207 may include software and/or logic to provide the functionality for receiving instructions related to yaw, pitch and roll error and providing directions to a user to correct a yaw, pitch or roll error. Further, the user guidance module 207 can determine a direction for taking images to be stitched together to create a panoramic image and providing directions to a user to take the next image for the panoramic image. In some embodiments, the user guidance module 207 can be implemented using programmable or specialized hardware including a field-programmable gate array (FPGA) or an application-specific integrated circuit (ASIC). In some embodiments, the user guidance module 207 can be implemented using a combination of hardware and software executable by processor 235. In some embodiments, the user guidance module 207 is a set of instructions executable by the processor 235. In some implementations, the user guidance module 207 is stored in the memory 237 and is accessible and executable by the processor 235. In some implementations, the user guidance module 207 is adapted for cooperation and communications with the processor 235, the memory 237 and other components of the image recognition application 103 via the bus 220.

The haptic feedback module 219 may include software and/or logic to provide the functionality for alerting a user when yaw, pitch or roll errors have been reduced by an acceptable margin. In an alternative embodiment, the haptic feedback module 219 may include software and/or logic to provide functionality for alerting a user when yaw, pitch or roll errors have been increased over a set threshold. In some embodiments, the haptic feedback module 219 receives a tilt error such as yaw, pitch or roll data. The haptic feedback module 219 can determine if the tilt error is above or below a set threshold and use the output device 249 to alert a user when a tilt error is above a certain threshold. Alternatively, in some embodiments, the haptic feedback module 219 may use the output device 249 to alert a user when a tilt error is below a certain threshold. In some embodiments, the haptic feedback module 219 can be implemented using programmable or specialized hardware including a field-programmable gate array (FPGA) or an application-specific integrated circuit (ASIC). In some embodiments, the haptic feedback module 219 can be implemented using a combination of hardware and software executable by processor 235. In some embodiments, the haptic feedback module 219 is a set of instructions executable by the processor 235. In some implementations, the haptic feedback module 219 is stored in the memory 237 and is accessible and executable by the processor 235. In some implementations, the haptic feedback module 219 is adapted for cooperation and communications with the processor 235, the memory 237 and other components of the image recognition application 103 via the bus 220.

The yaw computation module 213 may include software and/or logic to provide the functionality for analyzing an image and determining a yaw angle. The yaw computation module 213 receives an image and is capable of analyzing the image to determine a yaw error. The yaw computation module 213 may then send the yaw error to other modules or devices for further processing. Examples of processing performed by the yaw computation module 213 may be seen in FIGS. 23 and 24. In some embodiments, the yaw computation module 213 can be implemented using programmable or specialized hardware including a field-programmable gate array (FPGA) or an application-specific integrated circuit (ASIC). In some embodiments, the yaw computation module 213 can be implemented using a combination of hardware and software executable by processor 235. In some embodiments, the yaw computation module 213 is a set of instructions executable by the processor 235. In some implementations, the yaw computation module 213 is stored in the memory 237 and is accessible and executable by the processor 235. In some implementations, the yaw computation module 213 is adapted for cooperation and communications with the processor 235, the memory 237 and other components of the image recognition application 103 via the bus 220.

The distortion correction module 215 may include software and/or logic to provide the functionality for performing distortion correction of an image. In some embodiments, the distortion correction module 215 may receive yaw data from the yaw computation module 213 and use the yaw data to determine a de-skewing transform. The yaw computation module 213 may then perform distortion correction on an image based on the de-skewing transform. In some embodiments, the distortion correction module 215 can be implemented using programmable or specialized hardware including a field-programmable gate array (FPGA) or an application-specific integrated circuit (ASIC). In some embodiments, the distortion correction module 215 can be implemented using a combination of hardware and software executable by processor 235. In some embodiments, the distortion correction module 215 is a set of instructions executable by the processor 235. In some implementations, the distortion correction module 215 is stored in the memory 237 and is accessible and executable by the processor 235. In some implementations, the distortion correction module 215 is adapted for cooperation and communications with the processor 235, the memory 237 and other components of the image recognition application 103 via the bus 220.

The yaw user interface module 217 may include software and/or logic to provide the functionality to provide a user with directions to reduce a calculated yaw angle. In some embodiments, the yaw user interface module 217 may receive yaw data from the yaw computation module 213 and use the yaw data to generate an indicator of the yaw data on a user interface. In some embodiments, the yaw data may be used to calculate a percentage of yaw error present and may use the yaw user interface module 217 to generate an indicator based on the percentage of yaw error present. In alternative embodiments, the yaw user interface module 217 may use the yaw data to generate a yaw indicator and send the yaw indicator to the user interface module 211 for the user interface module 211 to generate a user interface that includes the yaw indicator. In some embodiments, the yaw user interface module 217 can be implemented using programmable or specialized hardware including a field-programmable gate array (FPGA) or an application-specific integrated circuit (ASIC). In some embodiments, the yaw user interface module 217 can be implemented using a combination of hardware and software executable by processor 235. In some embodiments, the yaw user interface module 217 is a set of instructions executable by the processor 235. In some implementations, the yaw user interface module 217 is stored in the memory 237 and is accessible and executable by the processor 235. In some implementations, the yaw user interface module 217 is adapted for cooperation and communications with the processor 235, the memory 237 and other components of the image recognition application 103 via the bus 220.

Methods

Figure 3:
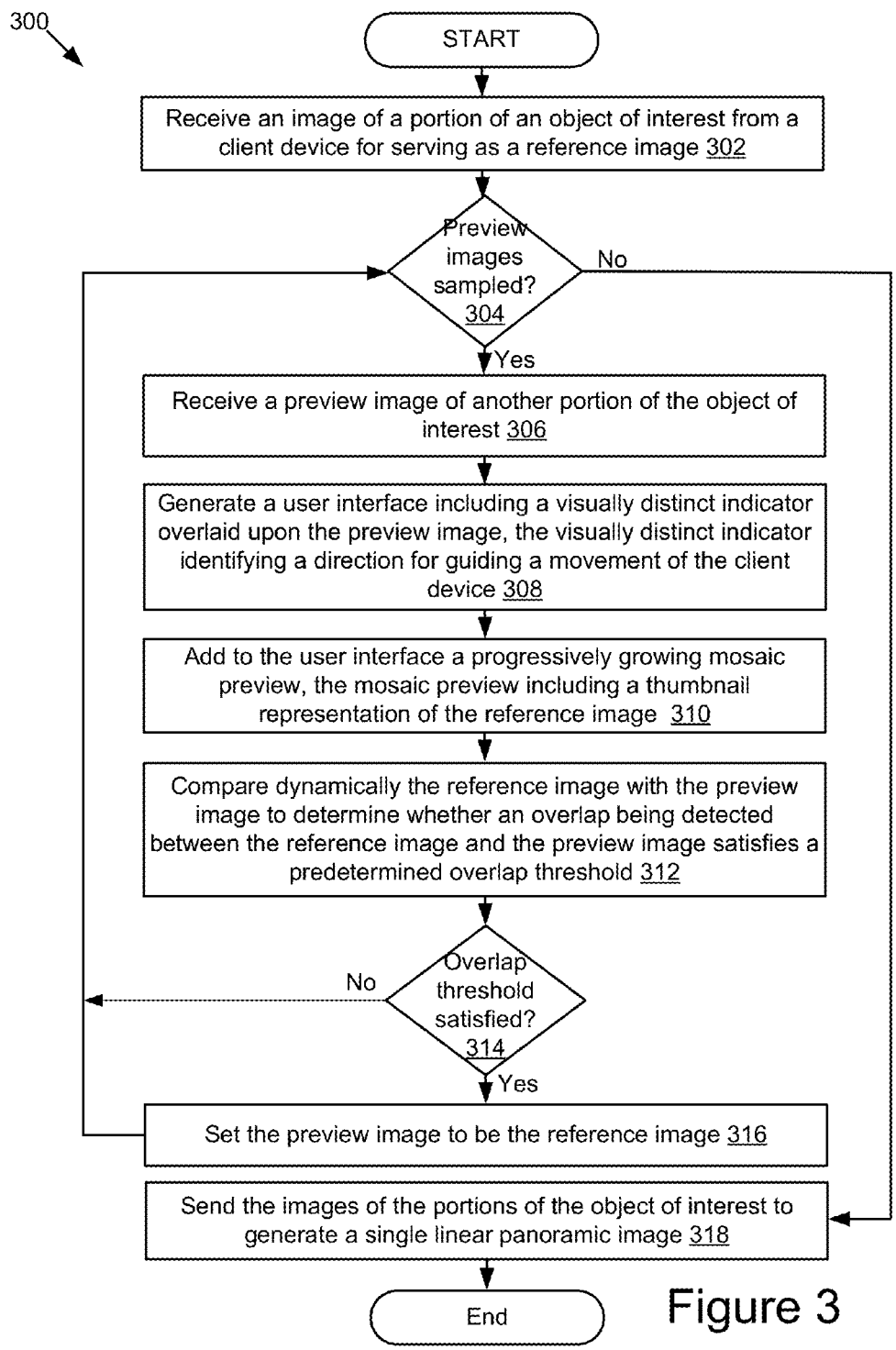
FIG. 3 shows a flow diagram illustrating one embodiment of a method for capturing a series of images for a single linear panoramic image.

FIG. 3 shows a flow diagram 300 illustrating one embodiment of a method for capturing a series of images for a single linear panoramic image. At 302, the stitching module 209 receives an image of a portion of an object of interest from a capture device 247. For example, the image can be an image of a shelf, a region, an artwork, a landmark, a scenic location, outer space, etc. At 304, the stitching module 209 determines features of the image, alternatively the stitching module 209 receives information from the feature extraction module 203 and the feature extraction module 203 determines features of the image. The image is processed and assuming it satisfies the criteria (location, orientation and alignment) for being the first image in the series of images needed to form the single linear panoramic image, it is stored as a reference image. Then the image recognition application 103 receives at least one preview image. At 306, the user interface module 211 presents a user interface including a current preview image of the object of interest on a display of the capture device 247. The user interface includes indicators to guide the user to capture a preview image that can be the next image in the series. At 308, the stitching module 209 compares dynamically the features of the reference image with the current preview image of the object of interest on the display of the capture device 247 to determine an overlap. At 310, the stitching module 209 determines whether the overlap between the image and the current preview image satisfies a predetermined overlap threshold. For example, the predetermined overlap threshold can be set at 60 percent. More images are received as preview images and the user interface is updated until an image with sufficient overlap is captured in the next step. At 312, the stitching module 209 captures and stores the preview image of the portion of the object of interest using the capture device 247 based on the overlap satisfying the predetermined overlap threshold. At 314, the user interface module 211 updates the user interface to indicate a storage of the captured image. For example, the user interface may flash briefly with an audible shutter clicking sound from the output device 249 on the client device 115 to indicate that the image has been captured. At 316, the stitching module 209 determines whether more preview images are being received or sampled. If no more images are being received or sampled, at step 318, the stitching module 209 sends the images of the portion of the object of interest to generate a single linear panoramic image. If more images are being received, the stitching module 209 repeats the process from step 304 with the images stored in step 312 as the reference image. In some embodiments, the stitching module 209 is responsive to user input and once the user stops providing preview images, the panoramic image is generated. In some embodiments, the stitching module 209 provides feedback to the user as to whether enough images have been captured to form a panoramic image. For example, the stitching module 209 may receive input as to the pattern of image capture and guide the user as to the next image to preview or provide. In other words, the method 300 may provide the user additional feedback as to what vertical and lateral movement to make to provide previews of images.

Figure 4A:
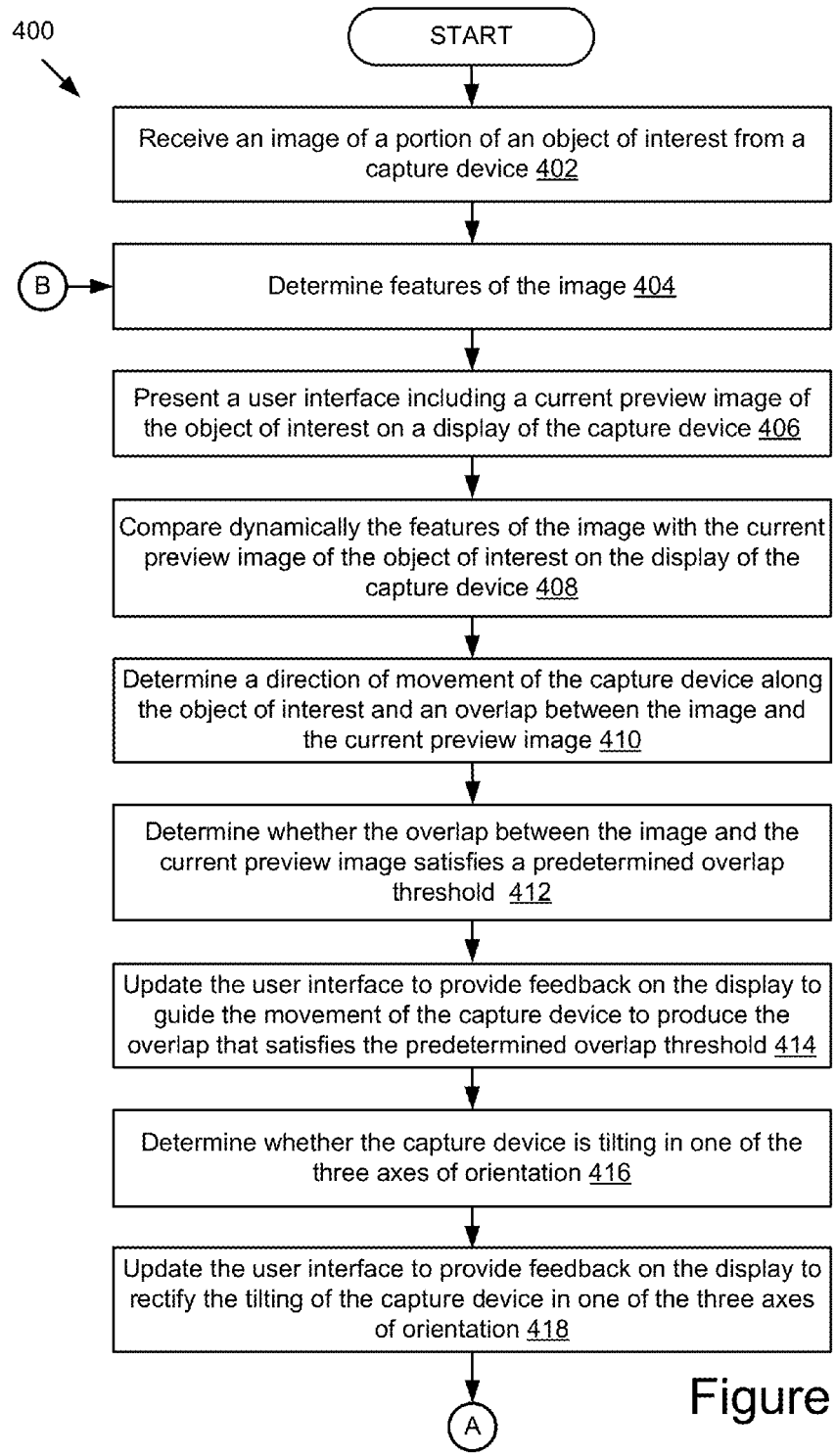
FIGS. 4A-4B show flow diagrams illustrating another embodiment of the method for capturing a series of images for a single linear panoramic image.
Figure 4B:
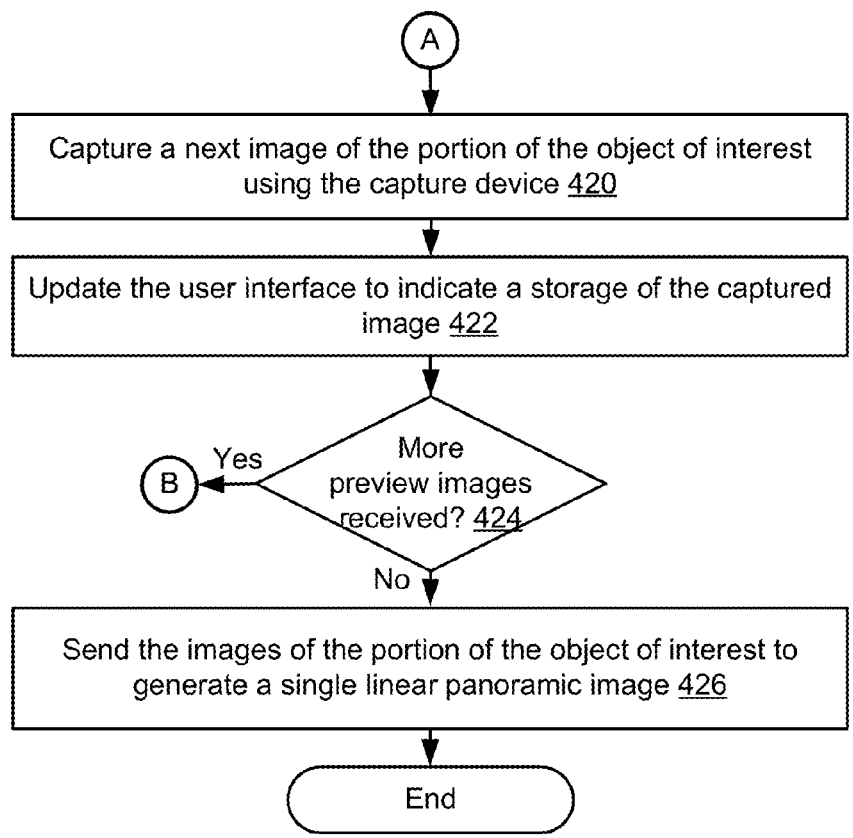

FIGS. 4A-4B show flow diagrams 400 illustrating another embodiment of a method for capturing a series of images for a single linear panoramic image. At 402, the stitching module 209 receives an image of a portion of an object of interest from a capture device 247. At 404, the stitching module 209 determines features of the image. At 406, the user interface module 211 presents a user interface including a current preview image of the object of interest on a display of the capture device 247. The current preview image can be the live preview generated on a display screen of the client device 115 by continuously and directly projecting the image formed by the lens onto the image sensor included within the client device 115.

At 408, the stitching module 209 compares dynamically the features of the image with the current preview image of the object of interest on the display of the capture device 247. At 410, the stitching module 209 determines a direction of movement of the capture device 247 along the object of interest and an overlap between the image and the current preview image. At 412, the stitching module 209 determines whether the overlap between the image and the current preview image satisfies a predetermined overlap threshold. For example, the predetermined overlap threshold can be set at 60 percent. At 414, the user interface module 211 updates the user interface to pro vide feedback on the display to guide the movement of the capture device 247 to produce the overlap that satisfies the predetermined overlap threshold. At 416, the stitching module 209 along with other modules, such as the yaw computation module 213, determines whether the capture device 247 is tilting in one of the three axes of orientation. For example, the three axes of orientations can be the X axis, the Y axis, and the Z axis. At 418, the user interface module 211 updates the user interface to provide feedback on the display to rectify the tilting of the capture device 247 in one of the three axes of orientation.

At 420, the stitching module 209 captures a next image of the portion of the object of interest using the capture device 247. At 422, the user interface module 211 updates the user interface to indicate a storage of the captured image, and uses the stored image as the reference image. At 424, the stitching module 209 determines whether more preview images are being received or sampled. If no more preview images are being received or sampled, at step 426, the stitching module 209 sends the images of the portion of the object of interest to generate a single linear panoramic image. If more images are being received or sampled, the stitching module 209 repeats the process from step 404.

Figure 5A:
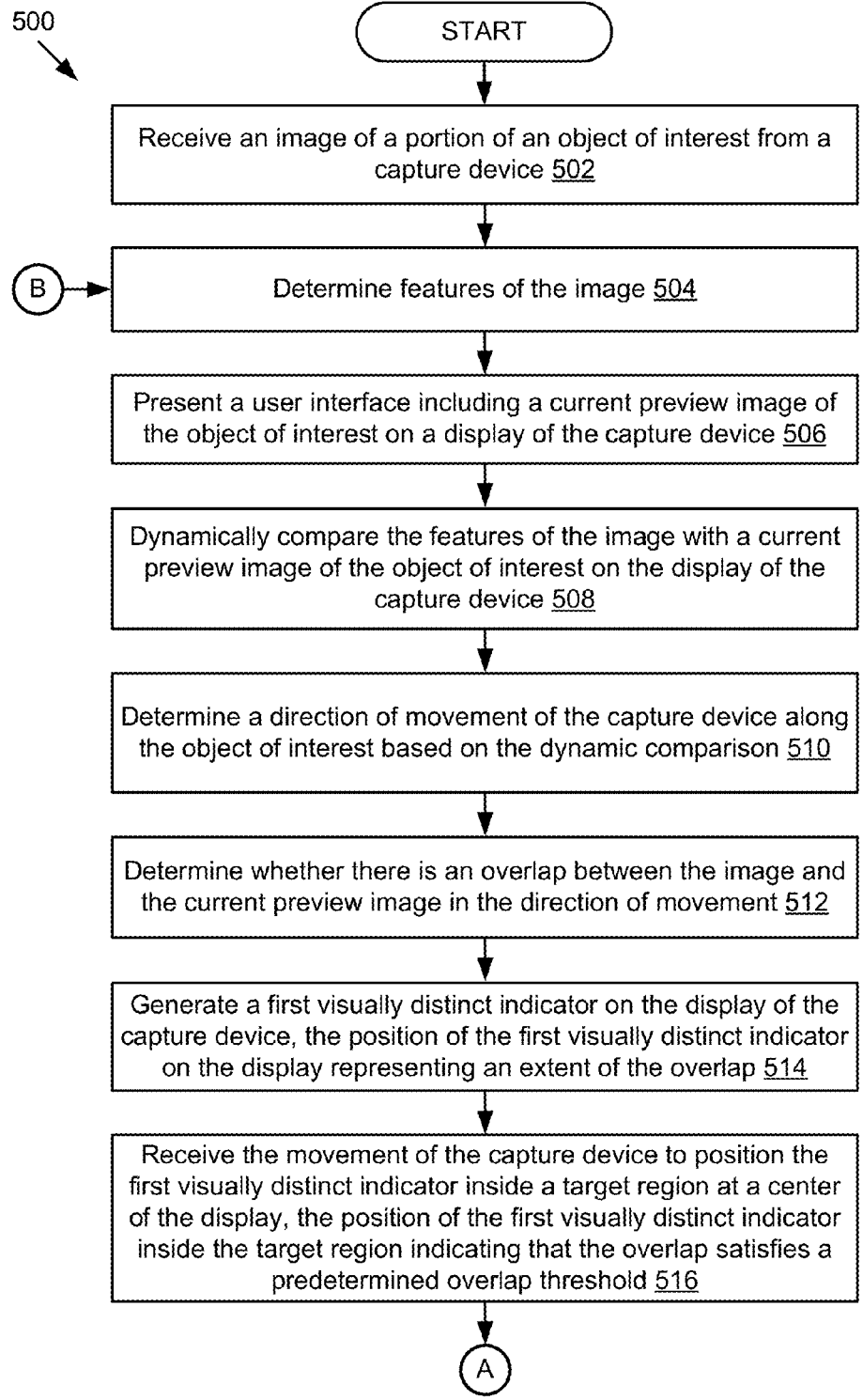
FIGS. 5A-5B show flow diagrams illustrating yet another embodiment of the method for capturing a series of images for a single linear panoramic image.
Figure 5B:
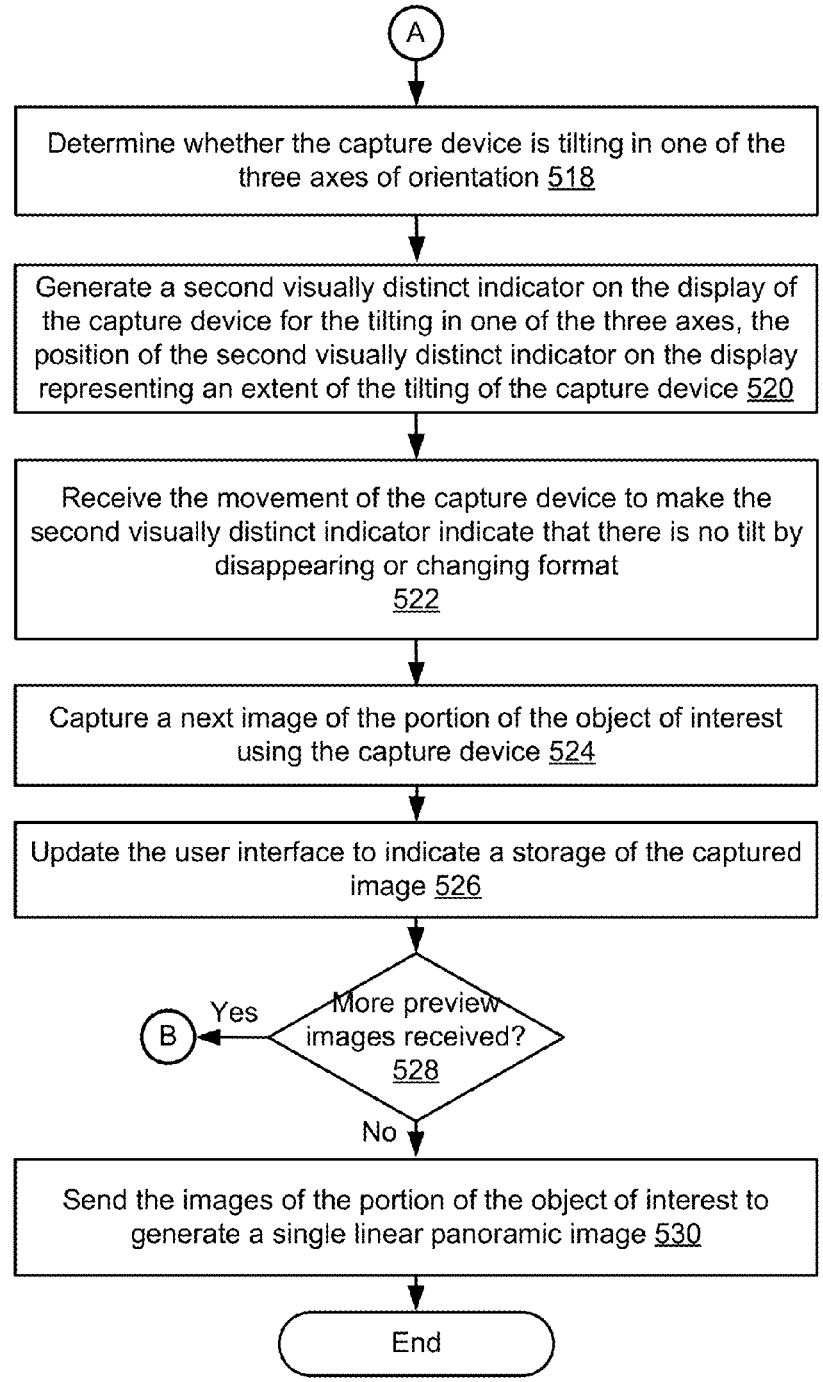

FIGS. 5A-5B show flow diagrams illustrating yet another embodiment of a method for capturing a series of images for a single linear panoramic image. At 502, the stitching module 209 receives an image of a portion of an object of interest from a capture device 247. For example, the image can be an image of a shelf, a region, an artwork, a landmark, a scenic location, outer space, etc. At 504, the stitching module 209 determines features of the image. At 506, the user interface module 211 presents a user interface including a current preview image of the object of interest on a display of the capture device 247. At 508, the stitching module 209 dynamically compares the features of the image with the current preview image of the object of interest on the display of the capture device 247. At 510, the stitching module 209 determines a direction of movement of the capture device 247 along the object of interest based on the dynamic comparison. At 512, the stitching module 209 determines whether there is an overlap between the image and the current preview image in the direction of movement. For example, the direction of movement can be in a north, south, east, or west direction.

At 514, the user interface module 211 generates a first visually distinct indicator on the display of the capture device 247, the position of the first visually distinct indicator on the display representing an extent of the overlap. For example, the visually distinct indicator, as shown on the user interface, may include but is not limited to a visually distinct shape, size, color, position, orientation, shading, etc. or combination thereof. At 516, the stitching module 209 receives the movement of the capture device 247 to position the first visually distinct indicator inside a target region at a center of the display, the position of the first visually distinct indicator inside the target region indicating that the overlap satisfies a predetermined overlap threshold. For example, the first visually distinct indicator can be a ball on the user interface or an eyelid covering a portion of a concentric circle. At 518, the stitching module 209, along with other modules, such as the yaw computation module 213, determines whether the capture device 247 is tilting in one of the three axes of orientation. At 520, the user interface module 211 generates a second visually distinct indicator on the display of the capture device 247 for the tilting in one of the three axes, the position of the second visually distinct indicator on the display representing an extent of the tilting of the capture device 247. In one example, the second visually distinct indicator for tilt can be a roll gradient indicator or an eyelid covering a portion of a concentric circle to show tilt feedback on the periphery of the user interface on the client device 115.

At 522, the stitching module 209 receives the movement of the capture device 247 to make the second visually distinct indicator indicate that there is no tilt by disappearing, changing format or providing a cue to the user from the haptic feedback module 219. At 524, the stitching module 209 captures a next image of the portion of the object of interest using the capture device 247 and uses the captured/stored image as the new reference image. At 526, the user interface module 211 updates the user interface to indicate a storage of the captured image. At 528, the stitching module 209 determines whether more preview images are being received or sampled. If no more preview images are being received or sampled, at step 530, the stitching module 209 sends the images of the portion of the object of interest to generate a single linear panoramic image. If more pre view images are being received or sampled, the stitching module 209 repeats the process from step 504.

Figure 6:
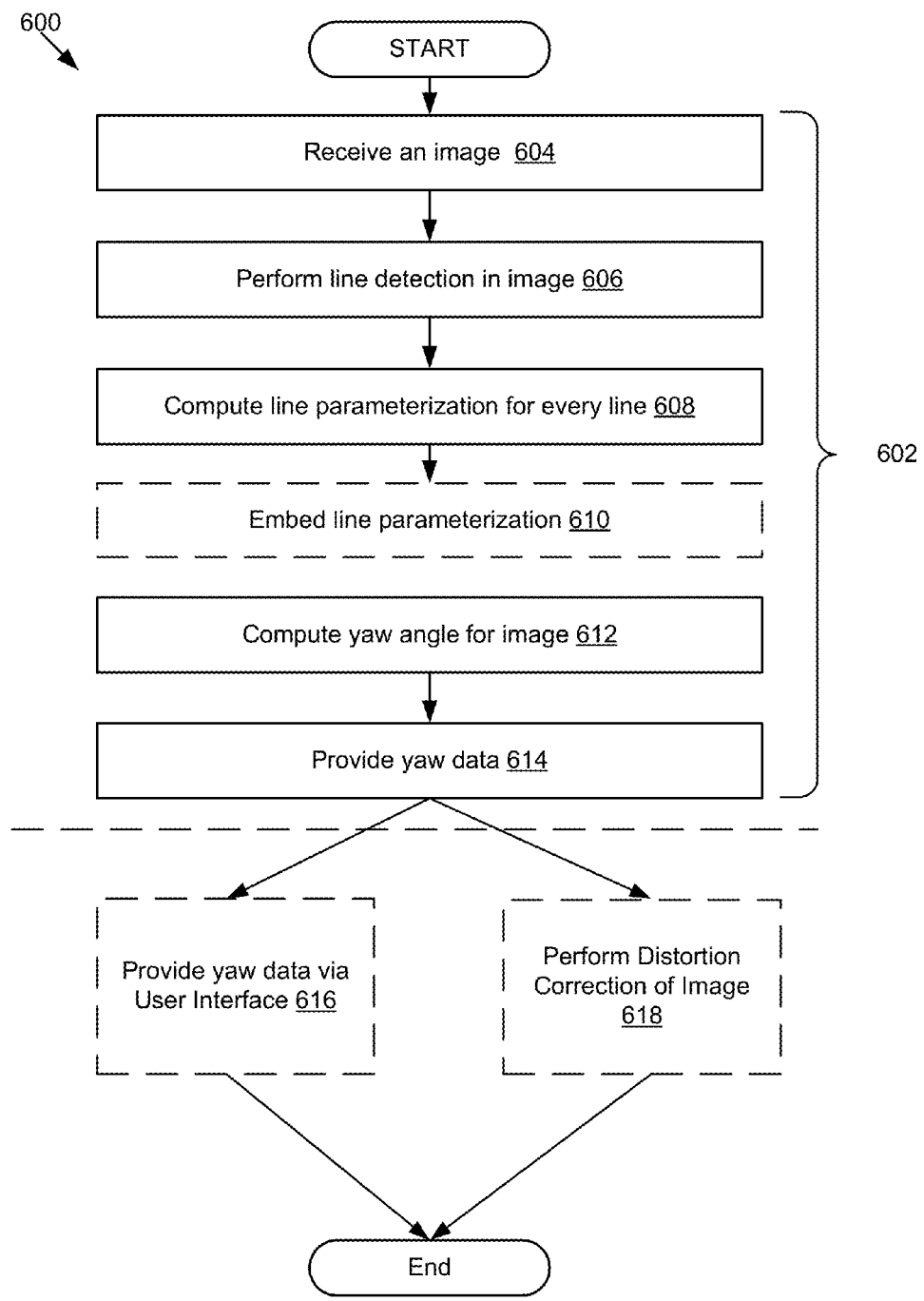
FIG. 6 shows a flow diagram illustrating one embodiment of a method for computing a yaw angle.

FIG. 6 show a flow diagram illustrating one embodiment of a method 600 for computing yaw angles from an image. More specifically, a method 602 for computing a yaw angle for the image as shown in the top half of FIG. 6. At 604, the yaw computation module 213 receives an image of a portion of an object of interest from a capture device 247 (for example, part of client device 115). For example, the image can be an image of a shelf, a region, an artwork, a landmark, a scenic location, outer space, etc. At 606, the yaw computation module 213 performs line detection in the received image to determine at least two lines running in parallel in the original scene, although the lines may not be parallel in the image due to perspective distortion. At 608, the yaw computation module 213 computes line parameterization for every line detected in the image. Line parameterization can be done by various methods including mathematical and image processing methods, one example includes determining a start point and end point of each detected line or determining a point and slope for every line. In some optional embodiments the line parameterization data may be embedded in metadata of the image at 610, such as in an Exchangeable Image File Format (EXIF) header of the image or the line parameterization data may be saved in the data storage 243. At 612, the yaw computation module 213 computes a yaw angle for the image using the line parameterization data. The yaw angle may be computed by using basic trigonometry described below with reference to FIGS. 23 and 24. At 614, the yaw computation module 213 may then provide the yaw angle and related data to other modules for further processing, such as the yaw user interface module 217 or the distortion correction module 215. In some embodiments, the yaw computation module 213 may be able to adjust the preview image and remove a portion of the yaw angle error. At 616, the yaw computation module 213 provides the data to the yaw user interface module 616. At 618, the yaw computation module 213 provides the data to the distortion correction module 215.

Figure 7:
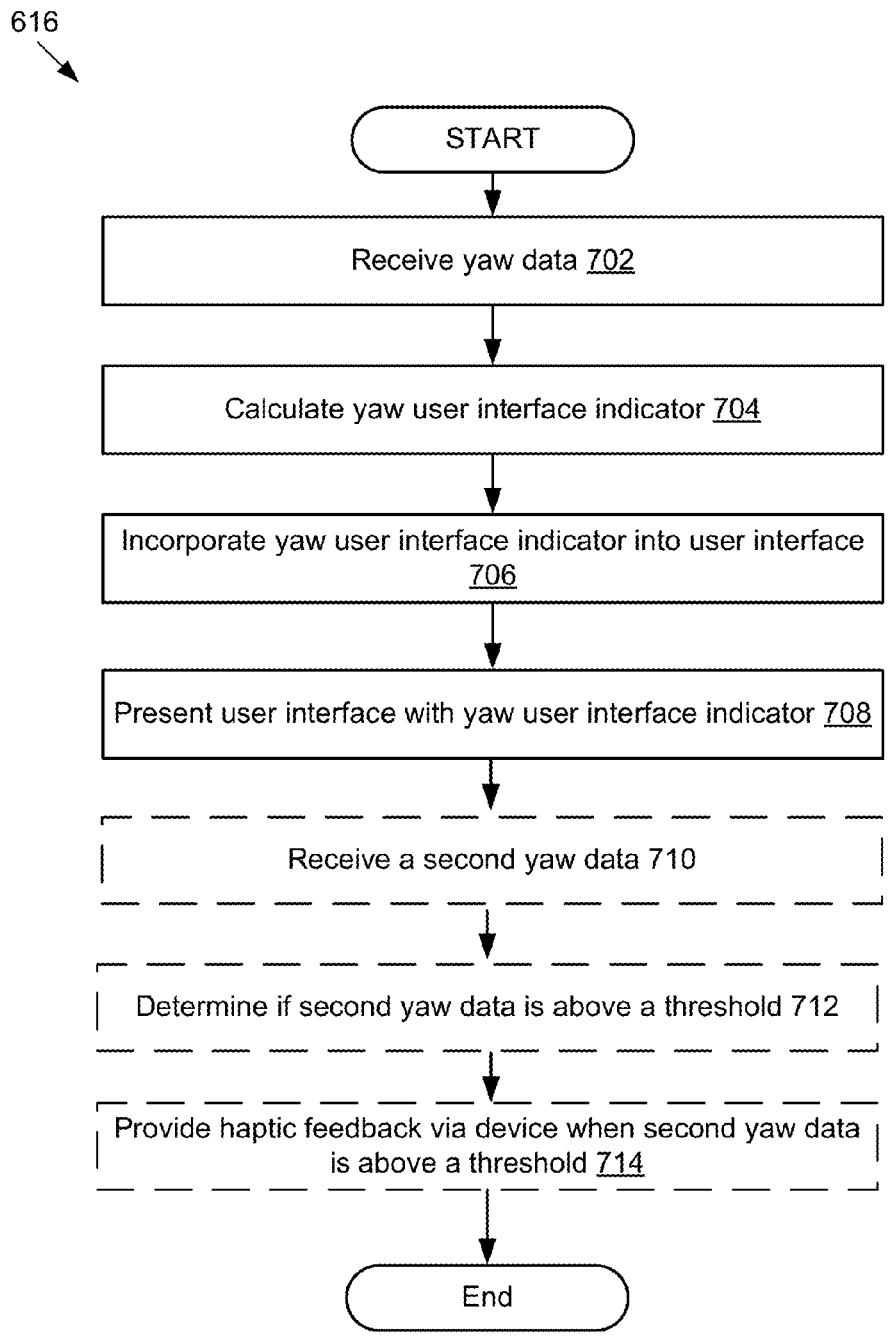
FIG. 7 shows a flow diagram illustrating one embodiment of a method for displaying yaw error on a user interface.

FIG. 7 shows a flow diagram illustrating an embodiment of a method 616 for providing an indicator to a user for correcting yaw data when capturing an image. At 702, the yaw user interface module 217 receives yaw data 702 from the yaw computation module 213. At 704, the yaw user interface module 217 calculates data for an indicator of the yaw data. The indicator may be an eyelid indicator configured to cover a portion of a concentric circle on a user interface, such that as the yaw data exhibits an increase in a yaw error, the eyelid indicator may cover a larger portion of the concentric circle and as the yaw data exhibits a decrease in the yaw-error, the eyelid indicator may cover a smaller portion of the concentric circle. In some embodiments, the yaw user interface module 217 may make an eyelid indicator that shades a portion of the concentric circle. Example user interfaces produced by the yaw user interface module 217 are described below with reference to FIGS. 19-28. At 706, the yaw user interface module 217 incorporates the eyelid indicator into a user interface for presentation to the user. The yaw user interface may be a stand-alone, user interface to assist in correction of yaw error, or the yaw user interface may be incorporated into the user interface module 211 to include other tilt indicators such as the ball interface displayed in FIGS. 13 and 14. At 710, the yaw user interface module 217 receives a second yaw data from a second image. At 712, the yaw user interface module 217 may determine if the second yaw data is above a threshold. At 714, when the second yaw data is above a threshold, the haptic feedback module 219 may use the output device 249 to alert the user that the yaw error is above a threshold. The output device 249 may alert the user for example by producing a vibration of the client device 115 or an auditory signal.

Figure 8:
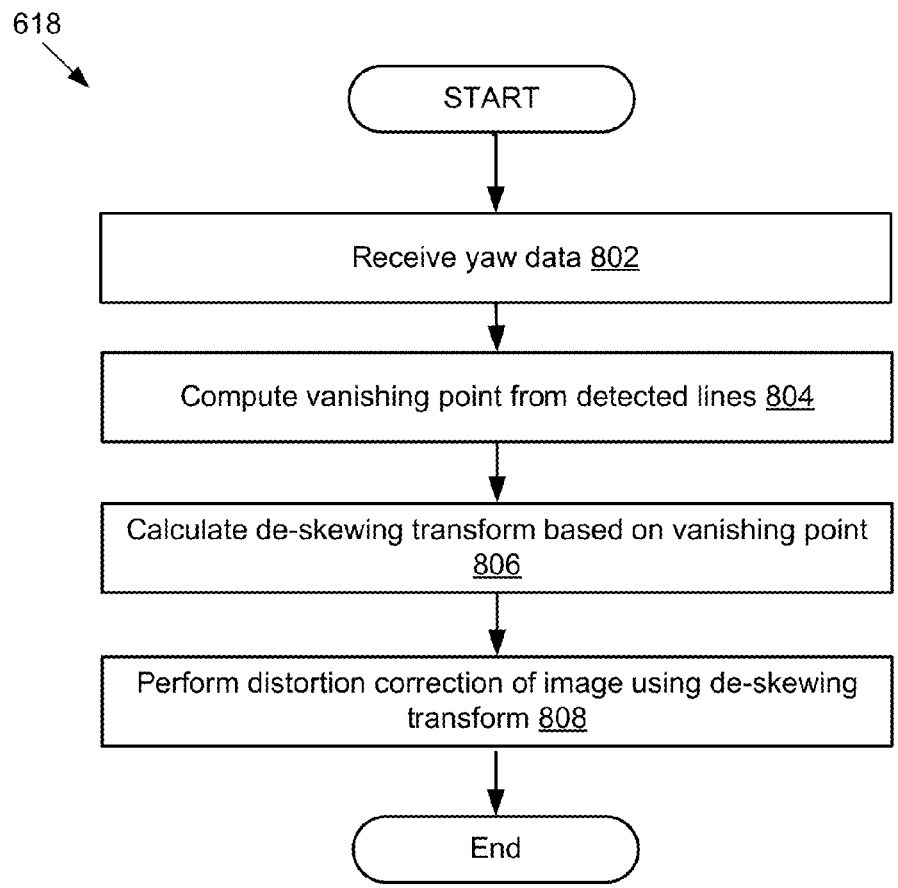
FIG. 8 shows a flow diagram illustrating one embodiment of a method for performing distortion correction.

FIG. 8 shows a flow diagram illustrating an embodiment of a method 618 of performing distortion correction on an image. At 802, the distortion correction module 215 receives yaw data from the yaw computation module 213 and is capable of being done independent of the yaw user interface module 217. At 804, the distortion correction module 215 uses the yaw data to detect lines of an image to calculate a vanishing point for the detected lines. The vanishing point is calculated by using a bundle of non-parallel lines, since if yaw error is present in an image, lines in the original scene that are parallel will appear to be non-parallel in the image as a result of distortion introduced by the yaw error. The non-parallel lines will intersect, when the lines are extended, at a vanishing point. At 806, the distortion correction module 215 calculates a de-skewing transform based on the vanishing point. At 808, the distortion correction module 215 performs distortion correction on the image using the de-skewing transform to create an image that reflects the parallel lines of the original scene and removes at least a portion of the yaw error introduced by an incorrect yaw tilt when the image was captured by the client device 115.

Figure 9:
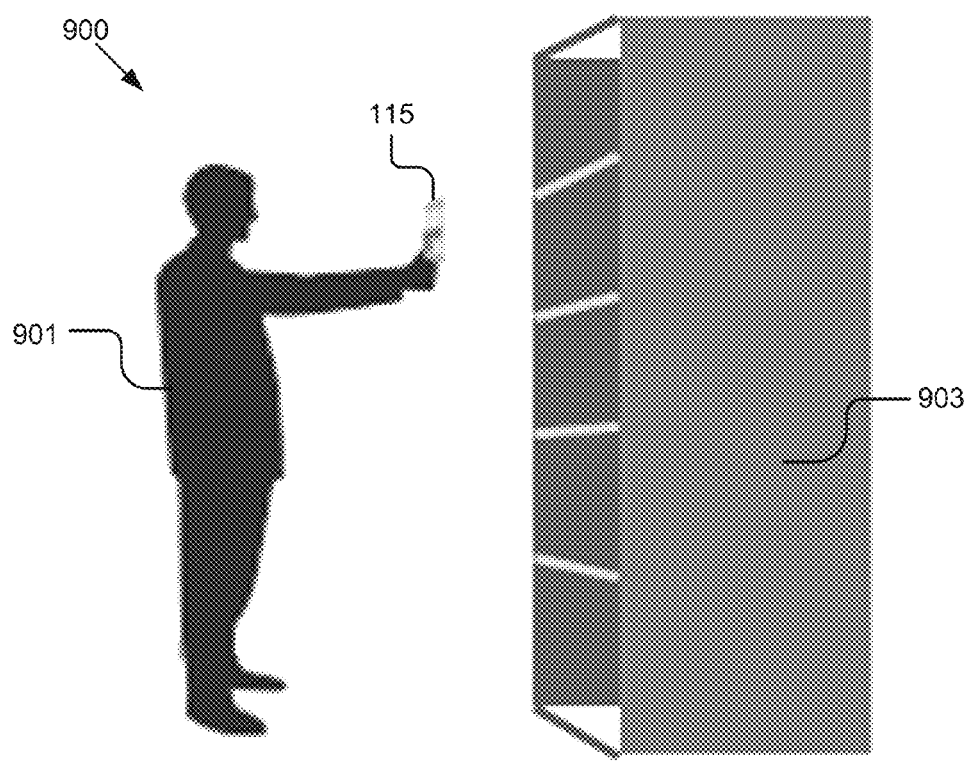
FIG. 9 shows a graphical representation of an embodiment of a user capturing an image of a shelf.

As shown in FIG. 9, the figure illustrates an example for capturing an image of a shelf 903. A user 901, may use the client device 115 that includes an image recognition application 103 to capture an image of the shelf 903. The shelf 903, may be any shelf that may hold a product, or the shelf may be replaced by a region, an artwork, a landmark, a scenic location, outer space, etc. As the user 901, uses the client device 115 various tilt errors may be introduced based on the user's positioning of the client device 115.

In some embodiments, the image recognition application 103 receives a request from a user of the client device 115 to capture an image of an object of interest. For example, the image can be an image of a shelf, a region, an artwork, a landmark, a scenic location, outer space, etc. The client device 115 captures an image and provides it to the image recognition application 103. The image recognition application 103 instructs the user interface module 211 to generate a user interface for capturing the image using the client device 115.

Figure 10:
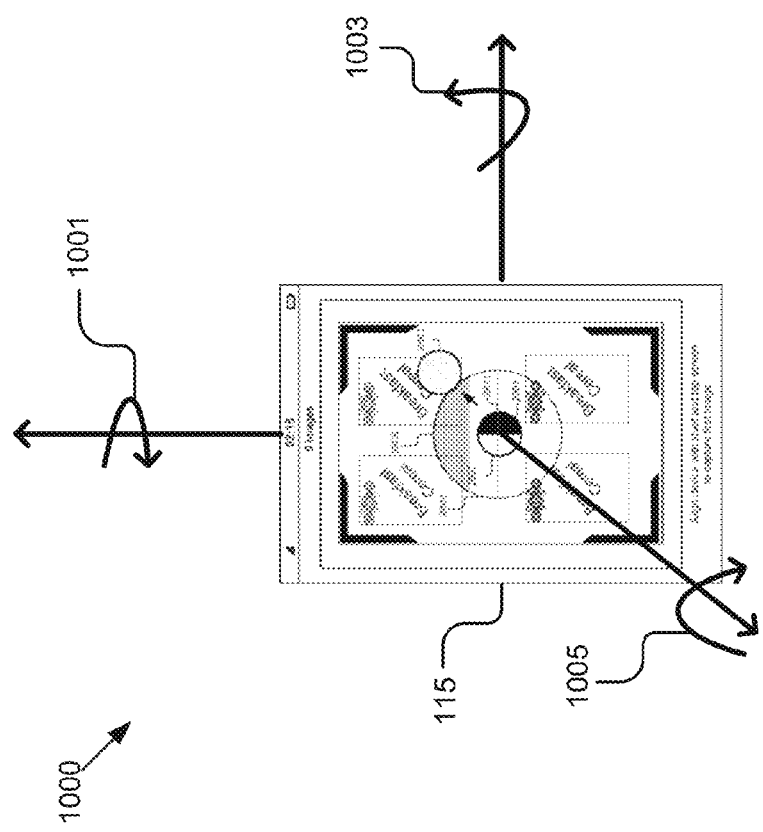
FIG. 10 shows a graphical representation of tilt errors.

As shown in FIG. 10, the FIG. 1000 illustrates three different tilts that may be introduced into a captured image depending on the positioning of the client device 115. The client device 115 may be rotated about a Y axis 1001 introducing a yaw error into an image. The client device 115 may also be rotated about an X axis 1103 introducing a pitch error into an image. Finally, the client device 115 may be rotated about a Z axis 1005 introducing a roll error into an image.

Figure 11:
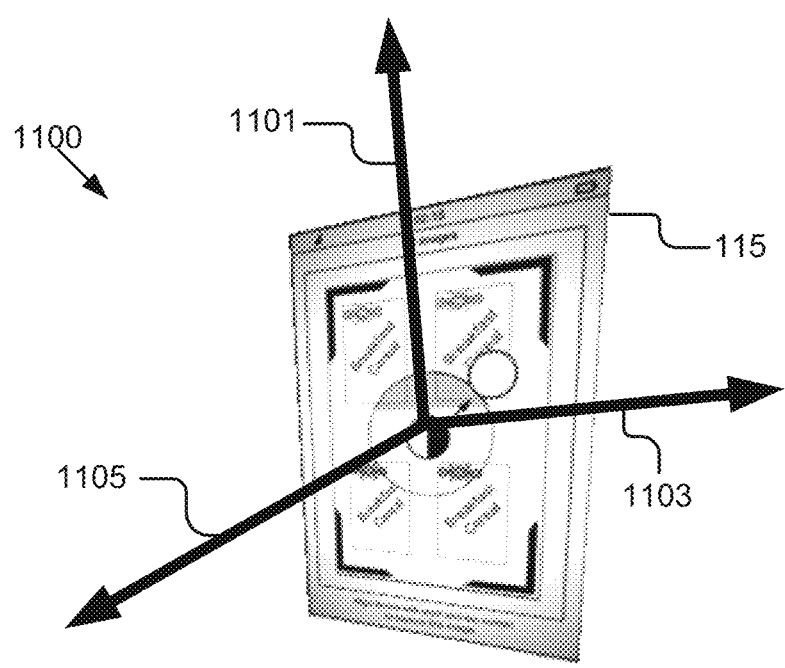
FIG. 11 shows a graphical representation of tilt error for a client device.

FIG. 11 shows an example display 1100 of a client device 115 and the three different tilts that may be introduced into an image captured by the client device 115. The client device 115 may include orientation sensors 245 (not shown) capable of detecting the tilt in the x-direction 1103 and z-direction 1105 using orientation sensors 245. However, in some embodiments, when the orientation sensors 245 are internal accelerometers of the client device 115, the orientation sensors 245 (e.g., internal accelerometers) may not be able to detect tilt in the y-direction 1101 because the internal accelerometers return the same angles regardless of the actual position for every position of yaw tilt of the client device 115.

User Interfaces

Figure 12:
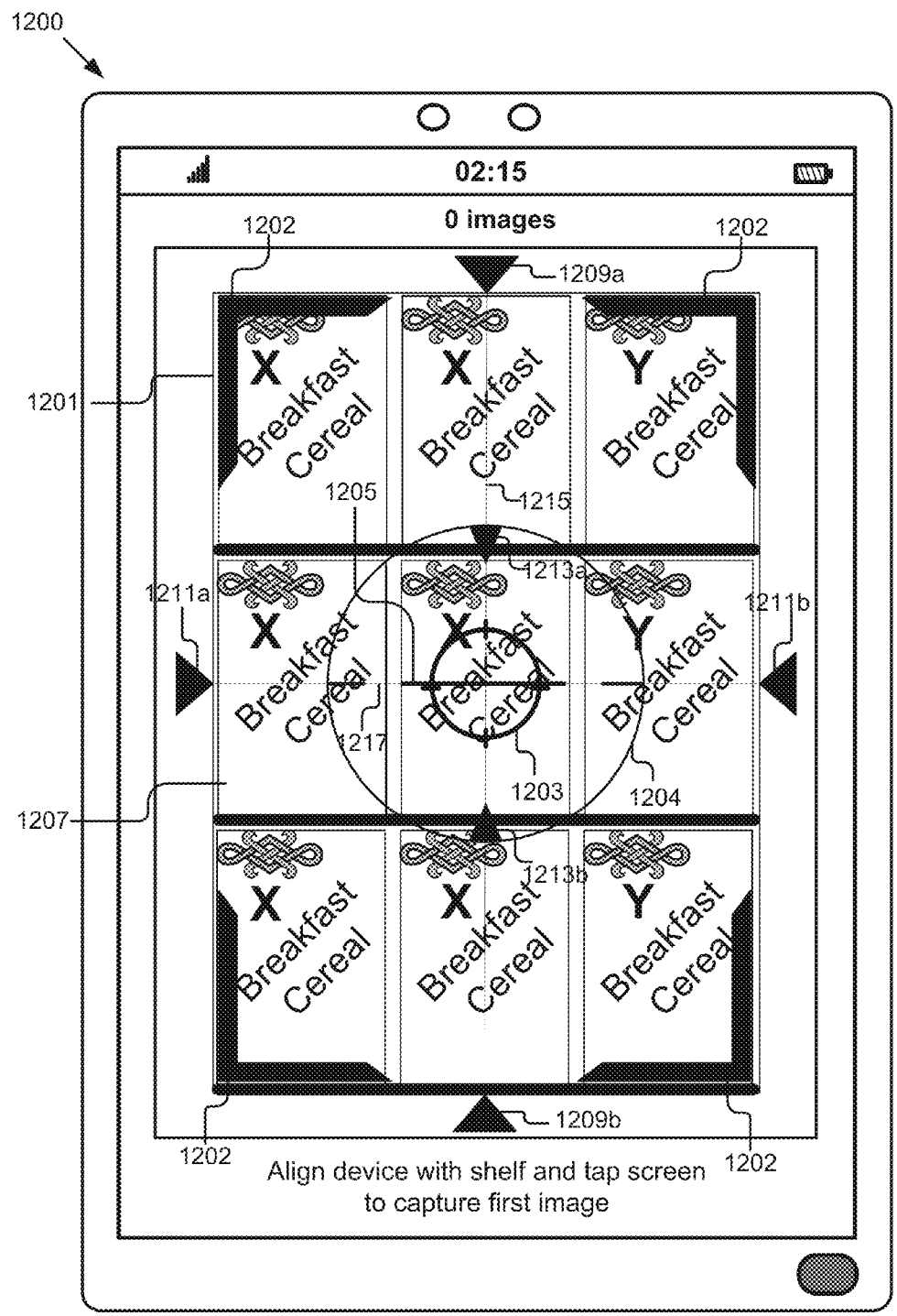
FIG. 12 shows a graphical representation of an embodiment of a user interface.

The example user interface in the graphical representation 1200 of FIG. 12 includes a frame 1201 defined by corner markers 1202 for aligning the client device 115 with the shelf for image capture, a target outline 1203 of a circle for centering the shelf at the middle of the display, a gyro horizon line 1217 with tilt reference arrows 1211a and 1211b on the periphery of the frame 1201, a gyro vertical line 1215 with tilt reference arrows 1209a and 1209b on the periphery of the frame 1201, and tilt-reference arrows 1213a and 1213b on the periphery of the larger concentric circle 1204. The tilt reference arrows 1209, 1211 and 1213 may be used for indicating whether a preview image 1207 of the shelf is off-center and/or tilting before capturing the image.

Figure 13:
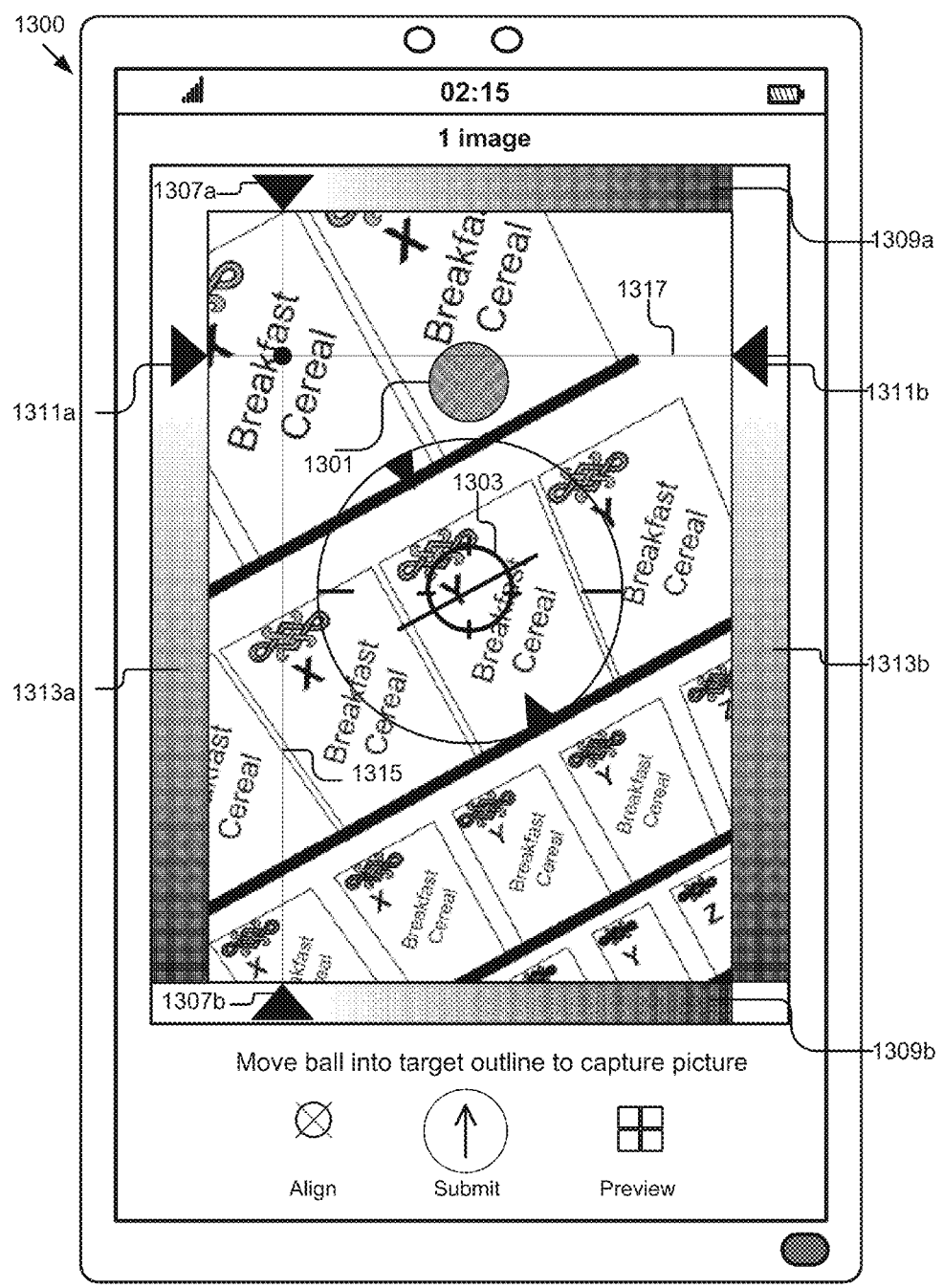
FIG. 13 shows a graphical representation of an embodiment of a user interface with tilt indicators.

As shown in the example of FIG. 13, the graphical representation 1300 illustrates a user interface that includes a ball 1301 and a target outline 1303 over a ghost image appearing on top the current preview image of the shelf as displayed by the client device 115. The aim for the user is to align and position the ball 1301 within the target outline 1303 on the user interface by moving the client device 115 to achieve alignment with the ghost image. The user interface 1300 includes a gyro horizon line 1317 with tilt reference arrows 1311 and a gyro vertical line 1315, with tilt reference arrows 1307. The user interface may also include tilt indicators 1309 and 1313 that shade a portion of a frame as the tilt increases.

Figure 14:
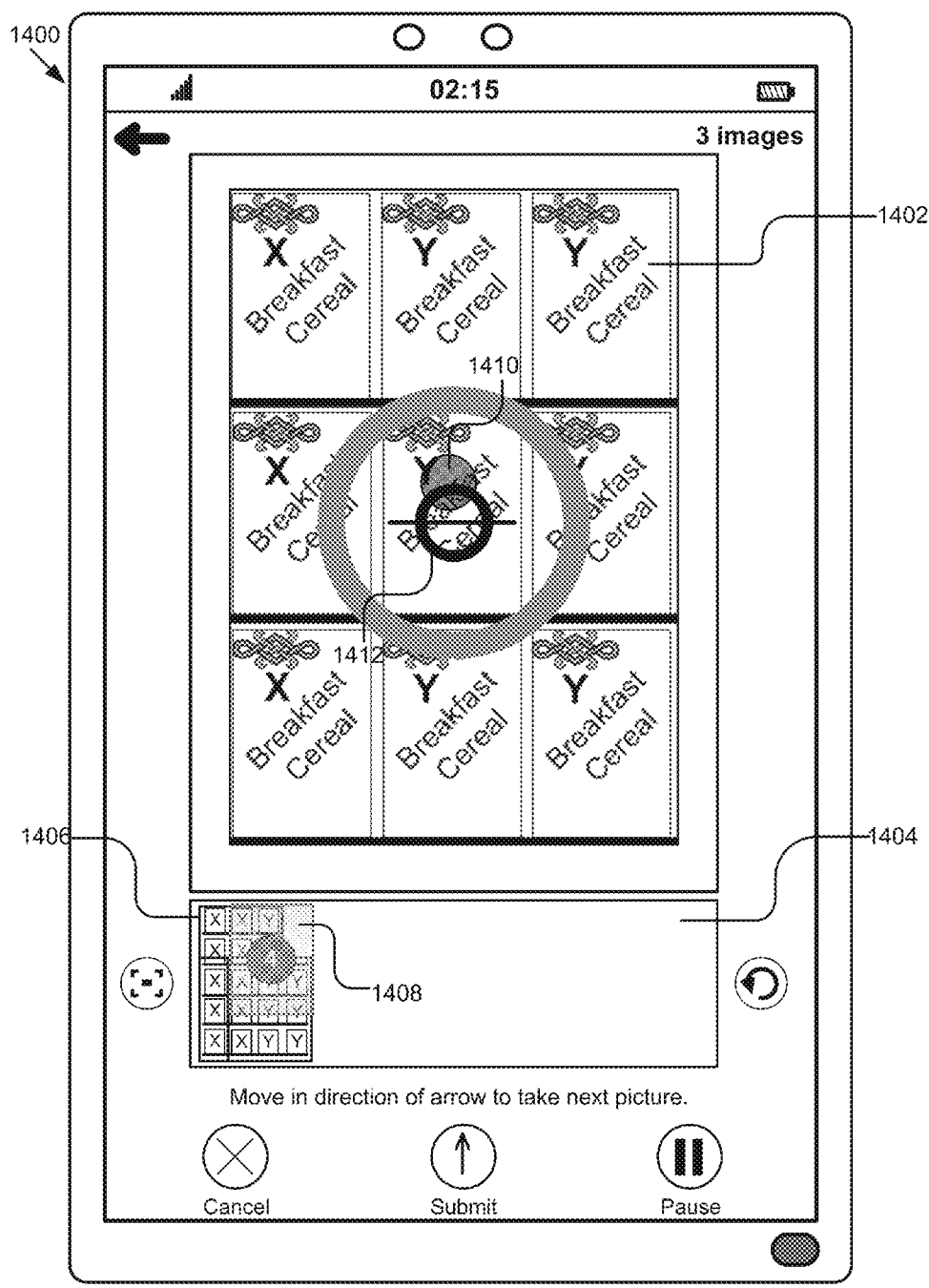
FIG. 14 shows a graphical representation of an embodiment of a user interface.

In another example, as shown in FIG. 14, the graphical representation 1400 illustrates a user interface that includes a target outline 1412 of a smaller concentric circle over a current preview image 1402 of the shelving unit as displayed on the client device 115. The user interface includes a ball 1410 that is displayed based on received tilt information. As a user rotates the client device 115 and reduces the tilt error in the preview image, the ball 1410 will move inside the target outline 1412, signaling to the user that the tilt is being reduced. The user interface also includes a region 1406 for displaying a mosaic preview of captured images below the current preview image 1404. The mosaic preview may progressively grow based on the captured images of the shelving unit being added to it. The mosaic preview included within the region 1406 can be pushed either to the right of the region 1406 or to the left of the region 1406 depending on the direction of movement of client device 115. The mosaic preview (currently empty) in the region 1406 includes an outline 1408 labeled '4' of an empty thumbnail image which may get replaced when the client device 115 captures a first image of the shelving unit.

The image of the shelf may be received for recognition and may include multiple items of interest. For example, the image can be an image of packaged products on a shelf (e.g., coffee packages, breakfast cereal boxes, soda bottles, etc.) in a retail store. The packaged product may include textual and pictorial information printed on its surface that distinguishes it from other items on the shelf. In one example, the display of the client device 115 may flash to indicate that the image was captured in response to the user tapping the screen. In some embodiments, the image recognition application 103 identifies a set of features from the image and a relative location to a point in the image (e.g., the location of one identified feature) where each feature occurs. In some embodiments, the client device 115 stores the captured image and the set of identified features in a cache. In other embodiments, the client device 115 sends the captured image to the recognition server 101.

For purposes of creating a linear panoramic image using a series of images, the user may move the client device 115 in any direction while remaining parallel to an object of interest for capturing subsequent images following a first image. For example, the client device 115 can move in a north, south, east, or west direction while remaining parallel to the shelving unit for capturing other images in the series. In some embodiments, the image recognition application 103 receives a user selection of a pattern of image capture for capturing the series of images. The image recognition application 103 instructs the user interface module 211 to provide guidance to the user via the client device 115 on how to capture a next image in the series of images based on the selected pattern of image capture.

Figure 15:
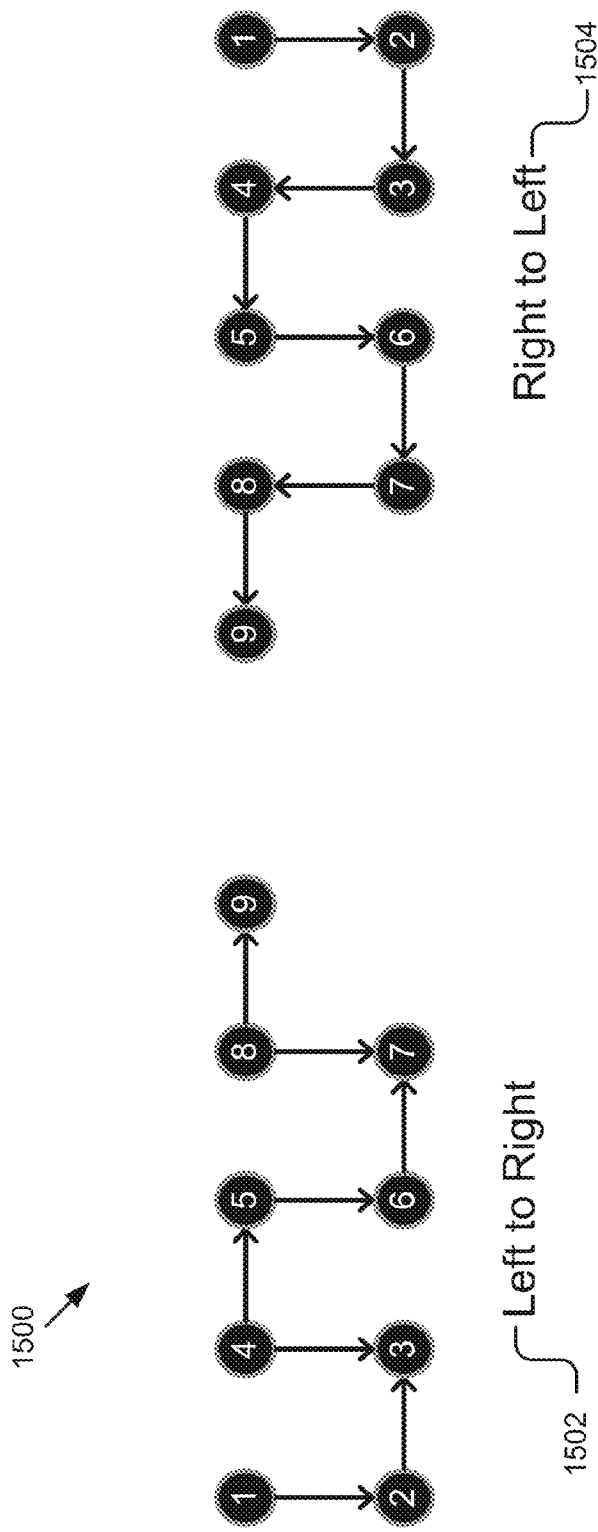
FIG. 15 shows a graphical representation one embodiment of the serpentine scan pattern of image capture.
Figure 16:
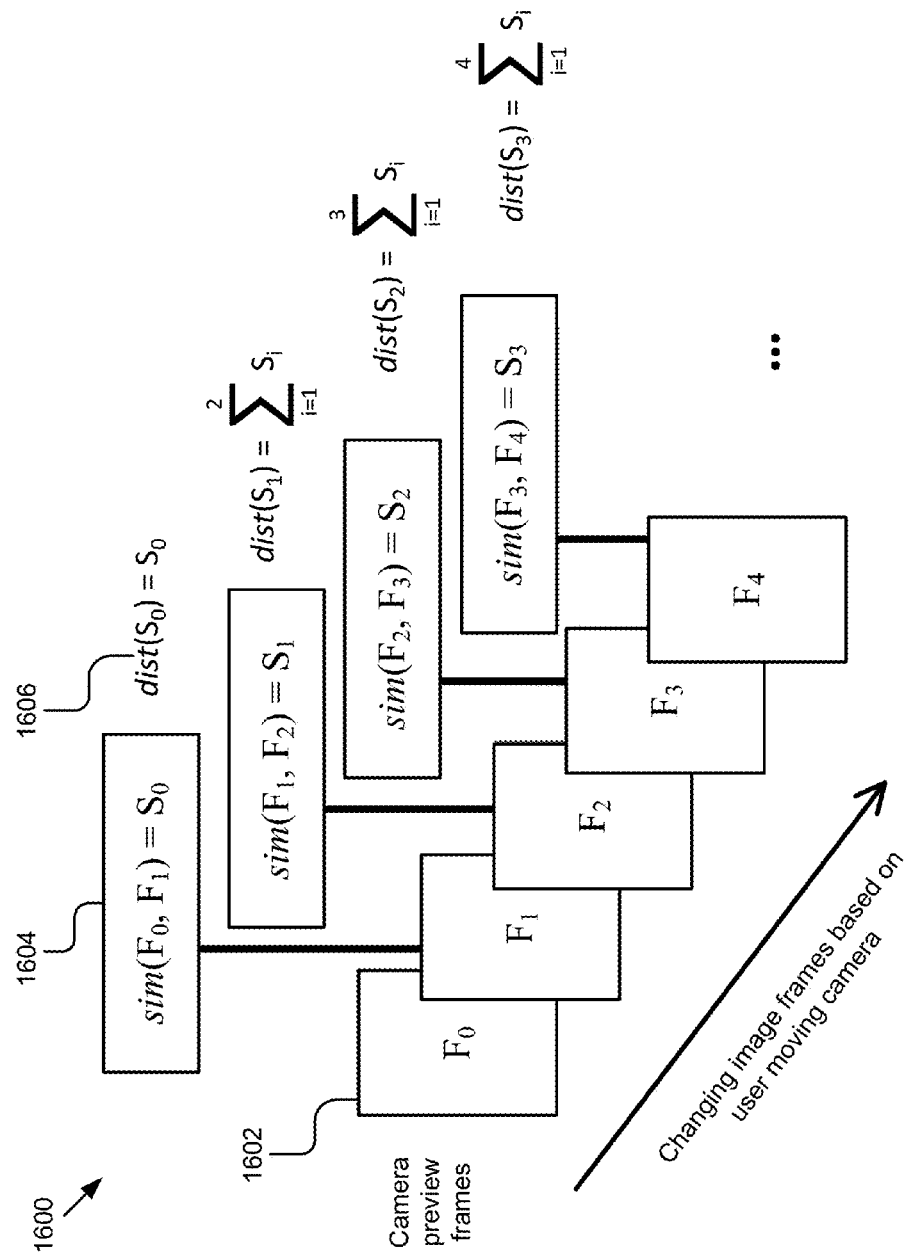
FIG. 16 shows a graphical representation of one embodiment of determining camera preview frames.

In one embodiment, the selected pattern of image capture may be a serpentine scan pattern as shown in FIG. 15. In the serpentine scan pattern, the sequence in image capture may alternate between the top and the bottom or between the left to right 1502 or right to left 1504 while the client device 115 is moving parallel to the object of interest in a horizontal direction (or a vertical direction). The image recognition application 103 may instruct the user interface module 211 to generate a user interface on the client device 115 that guides the user to move for example, the client device 115 first down (or up) the object of interest, then to move to the right (or left) of the object of interest, then to move up (or down) the object of interest, then to move to the right (or left) of the object of interest, and again to move down (or up) the object of interest, in order to follow the serpentine scan pattern. The image recognition application 103 receives a captured image of the object of interest at the end of each movement of the client device 115.

In another embodiment, the selected pattern of image capture may be a raster scan pattern. The raster scan pattern covers the image capture of the object of interest by moving the client device 115 progressively along the object of interest, one line at a time. The image recognition application 103 instructs the user interface module 211 to generate a user interface on the client device 115 that guides the user to move for example, the client device 115 from left to right (or right to left) of the object of interest in a line, then move down (or up) the object of interest at the end of line and start again from left to right (or right to left) of the object of interest in a next line, in order to follow the raster scan pattern. The image recognition application 103 receives a captured image of the object of interest at the end of each movement of the client device 115 from left to right (or right to left).

In yet another embodiment, the selected pattern of image capture may be an over-and-back scan pattern. The over-and-back scan pattern covers the image capture of the object of interest by moving the client device 115 over a portion of the object of interest in a horizontal (or vertical) direction to one end and then moving the client device 115 back to capture another portion of the object of interest that was not covered. The image recognition application 103 instructs the user interface module 211 to generate a user interface on the client device 115 that guides the user to move for example, the client device 115 from left to right (or right to left) of the object of interest to one end, then move down (or up) the object of interest, and to move from right to left (or left to right) back to the starting end, in order to follow the over and back scan pattern. The image recognition application 103 receives a captured image of the object of interest at the end of each movement of the client device 115 from left to right to one end and at the end of each movement of the client device 115 from right to left and back to the starting end.

In some embodiments, the stitching module 209 receives the series of captured images with a certain amount of overlap between the images. In some embodiments, the image recognition application 103 instructs the user interface module 211 to guide the user to capture a next image in the series of images that is overlapping by a certain amount with a previously captured image. This may be a threshold amount of overlap (for e.g., 60%) between the images expected by a stitching algorithm used for creating the linear panorama by stitching together each of the individually captured images in the series. In some embodiments, the image overlap threshold value may be tuned based on the stitching algorithm. For example, the stitching algorithm can be one or more from a group of Scale-Invariant Feature Transform (SIFT) algorithm, Random Sample Consensus (RANSAC) algorithm, Progressive Sample Consensus (PROSAC) algorithm, RIVR algorithm, etc.

In some embodiments, the image recognition application 103 receives the current preview image of the object of interest as displayed by the client device 115 when pointing at the object of interest. The current preview image can be the live preview generated on a display screen of the client device 115 by continuously and directly projecting the image formed by the lens onto the image sensor included within the client device 115. In some embodiments, the feature extraction module 203 determines image features for the images in the camera preview as the client device 115 moves along the object of interest. The stitching module 209 dynamically compares the identified features of a previously captured image of the object of interest with the current preview image being displayed by the client device 115. The stitching module 209 identifies distinctive features in the previously captured image and then efficiently matches them to the features of the current pre view image to quickly establish a correspondence between the pair of images. For example, in FIG. 16, the process 1600 shows the first set of image features 1602 may be $F_0$, then the variable 'i' may be used to represent the most recent, previously captured image $F_i$, and therefore the set of image features for the current image may be represented by $F_{i+1}$. In some embodiments, the stitching module 209 uses a similarity function to compare the previously captured image $F_i$ to the current image $F_{i+1}$ to generate a similarity measure $S_i$. For example, the formula 1604 may be stated as sim $(F_i, F_{i+1})=S_i$. At 1606, the value $S_i$ represents the amount of similarity between the previously captured image $F_i$ and the current image $F_{i+1}$.

In some embodiments, the stitching module 209 receives a request from the user to align a current preview image of the object of interest as displayed by the client device 115 with a view point of a previously captured image after an interruption in the sequence of image capture pattern. For example, the user may get interrupted after capturing an image of a portion of object of interest and may have to leave the scene for a period of time. The user may then want to return to capturing subsequent images of the object of interest after the interruption. In some cases, the user may not remember where they were interrupted in the image capture process. In the example of capturing images of a shelving unit in an aisle, it is critical to restart the image capture process at the same position where the last image was captured before interruption. In some embodiments, the visually distinct indicators for overlap and/or direction may not function unless the user restarts the image capture process from a position of good overlap with the previously captured image.

The image recognition application 103 instructs the user interface module 211 to generate a user interface that places the previously captured image as a ghost image on top of the current preview image being displayed by the client device 115. The feature extraction module 203 determines and stores the features of the previously captured image in a cache to use as a reference image when an interruption in the capture process occurs. The stitching module 209 instructs the user interface module 211 to update the user interface with a visually distinct indicator for realignment. The feature extraction module 203 determines image features for the images in the camera preview as the client device 115 moves along the object of interest. The visually distinct indicator for realignment, as shown on the user interface, may include but is not limited to a visually distinct shape, size, color, position, orientation, shading, etc. or combination thereof. For example, the user may walk over to a location along the object of interest where they understand the last image was previously captured and use the overlay of the ghost image on top of the current preview image to start realignment process. The stitching module 209 realigns the capture user interface by dynamically comparing the features of the previously captured image to the image features associated with the image frames displayed in the camera preview of the client device. The stitching module 209 couples the position of the visually distinct indicator for realignment on the user interface with the movement of the client device 115. The stitching module 209 dynamically compares the identified features of the previously captured image of the object of interest with the current preview image in the direction of movement of the client device 115.

In some embodiments, the stitching module 209 receives a request from the user to align a current preview image of the object of interest as displayed by the client device 115 with a view point of a previously captured image after an interruption in the sequence of image capture pattern. For example, the user may get interrupted after capturing an image of a portion of object of interest and may have to leave the scene for a period of time. The user may then want to return to capturing subsequent images of the object of interest after the interruption. In some cases, the user may not remember where they were interrupted in the image capture process. In the example of capturing images of a shelving unit in an aisle, it is critical to restart the image capture process at the same position where the last image was captured before interruption. In some embodiments, the visually distinct indicators for overlap and/or direction may not function unless the user restarts the image capture process from a position of good overlap with the previously captured image.

The stitching module 209 instructs the user interface module 211 to generate a user interface that places the previously captured image as a ghost image on top of the current preview image being displayed by the client device 115. The stitching module 209 determines and stores the features of the previously captured image in a cache to use as a reference image when an interruption in the capture process occurs. The stitching module 209 instructs the user interface module 211 to update the user interface with a visually distinct indicator for realignment. The stitching module 209 determines image features for the images in the camera preview as the client device 115 moves along the object of interest. The visually distinct indicator for realignment, as shown on the user interface, may include but is not limited to a visually distinct shape, size, color, position, orientation, shading, etc. or combination thereof. For example, the user may walk over to a location along the object of interest where they understand the last image was previously captured and use the overlay of the ghost image on top of the current preview image to start realignment process. The stitching module 209 realigns the capture user interface by dynamically comparing the features of the previously captured image to the image features associated with the image frames displayed in the camera preview of the client device. The stitching module 209 couples the position of the visually distinct indicator for realignment on the user interface with the movement of the client device 115. The stitching module 209 dynamically compares the identified features of the previously captured image of the object of interest with the current preview image in the direction of movement of the client device 115. For example, the set of image features for the previously captured image may be represented as $F_0$. The set of image features determined for a preview image frame may be represented by $F_i$. As the client device 115 moves along the object of interest to realign with the previously captured image, the stitching module 209 generates image features for each preview image frame. If variable 'i' in $F_i$ is equal to five (i.e. five preview image frames have been captured not counting the previously captured image and the fifth preview image frame is $F_5$), then the stitching engine uses a similarity function to compare the previously captured image $F_0$ to the current preview image $F_5$ to generate a similarity measure $S_5$. For example, the similarity function can be represented as sim $(F_0, F_5)=S_5$. This value $S_5$ represents how similar the two images are to each other and indicates how far the user must move along the object of interest to realign with the previously captured image. The similarity measure $S_5$ indicates a comparison with the previously captured image $F_0$ serving as the reference and not with the last image feature set $F_4$ that precedes the image feature set $F_5$. The stitching module 209 then translates the dynamic comparison in the direction of movement into changing the position of the visually distinct indicator on the user interface such that it provides the user with feedback on how to move the client device 115 to achieve a proper realignment with the previously captured image. In some embodiments, the stitching module 209 receives a confirmation from the user interface module 211 that the realignment is successful. The stitching module 209 then instructs the user interface module 211 to return to the user interface to guide the user on how to capture the next image in the series of images.

Figure 17:
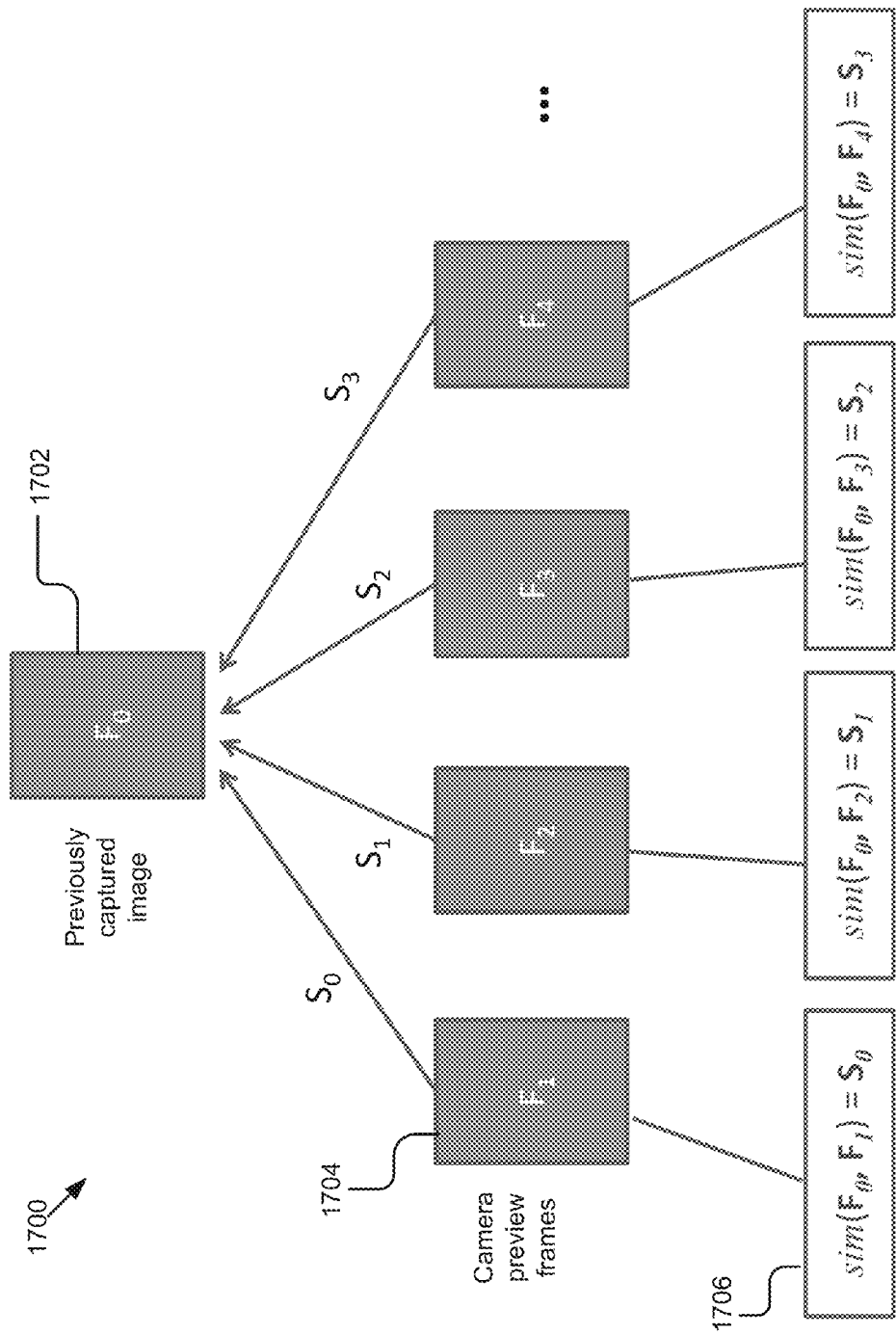
FIG. 17 shows a graphical representation of an alternative embodiment of determining camera preview frames.

As shown in the example of FIG. 17, the graphical representation 1700 illustrates an embodiment of the realignment process for generating the visually distinct indicator for realignment. In FIG. 17, the graphical representation 1700 includes camera preview frames 1704 for changing image frames ($F_1$ to $F_4$) based on the user moving the client device 115. The graphical representation 1700 also includes a similarity measure function 1706 computed between features of each preview image frame 1704 and the features of the previously captured image 1702. The set of image features for the previously captured image may be represented as $F_0$. The set of image features determined for a preview image frame may be represented by $F_i$. As the client device 115 moves along the object of interest to realign with the previously captured image, the stitching module 209 generates image features for each preview image frame. If variable 'i' in $F_i$ is equal to five (i.e. five preview image frames have been captured not counting the previously captured image and the fifth preview image frame is $F_5$), then the stitching engine uses a similarity function to compare the previously captured image $F_0$ to the current preview image $F_5$ to generate a similarity measure $S_5$. For example, the similarity function can be represented as sim $(F_0, F_5)=S_5$. This value $S_5$ represents how similar the two images are to each other and indicates how far the user must move along the object of interest to realign with the previously captured image. The similarity measure $S_5$ indicates a comparison with the previously captured image $F_0$ serving as the reference and not with the last image feature set $F_4$ that precedes the image feature set $F_5$. The user guidance module 207 then translates the dynamic comparison in the direction of movement into changing the position of the visually distinct indicator on the user interface such that it provides the user with feedback on how to move the client device 115 to achieve a proper realignment with the previously captured image. In some embodiments, the stitching module 209 receives a confirmation from the user interface module 211 that the realignment is successful. The image recognition application 103 then instructs the user interface module 211 to return to the user interface to guide the user on how to capture the next image in the series of images. In some embodiments, the stitching module 209 uses the image overlap threshold as a parameter along with the dynamic feature comparison between the current preview image and the previously captured image for providing guidance and/or feedback to the user via a user interface on the client device 115. For example, the stitching module 209 uses the image overlap threshold to set a similarity value 'V' at 0.6. In some embodiments, the stitching module 209 receives data including movement of the client device 115 when the user moves the client device 115 in one of the directions (e.g., north, south, east or west) parallel to the object of interest after capturing the previous image. The stitching module 209 determines a direction of movement of the client device 115 based on the dynamic feature comparison between the previously captured image of the object of interest and the current preview image as displayed by the client device 115. The stitching module 209 determines whether there is an overlap between the previously captured image and the current preview image in the direction of movement of the client device 115. The stitching module 209 instructs the user interface module 211 to generate a visually distinct indicator for overlap on the user interface responsive to the determined overlap in the direction of the movement of the client device 115. The visually distinct indicator for overlap, as shown on the user interface, may include but is not limited to a visually distinct shape, size, color, position, orientation, shading, etc. or combination thereof.

The stitching module 209 couples the position of the visually distinct indicator for overlap on the user interface with the direction of movement of the client device 115. The stitching module 209 continues to dynamically compare the identified features of the previously captured image of the object of interest with the current preview image in the direction of movement of the client device 115. The stitching module 209 translates the dynamic comparison in the direction of movement into changing the position of the visually distinct indicator on the user interface which provides the user with feedback on how to move the client device 115 to achieve an optimal overlap satisfying the predetermined overlap threshold. For example, if the overlap between the previously captured image and the current preview image satisfies a predetermined image overlap threshold (i.e., similarity value 'V'=60%) in a direction of movement, then the position of the visually distinct indicator for overlap changes on the user interface to indicate that such a condition has been met. The visually distinct indicator for overlap may move into a bounded region of a geometric shape such as, a circle, a square, or a polygon to illustrate the condition has been met for optimal overlap. In some embodiments, the stitching module 209 uses a tolerance value 'T' which along with similarity value 'V' may be used to compute when the visually distinct indicator for overlap is within range, for example, inside the geometric shape. In some embodiments, the stitching module 209 uses the tolerance value 'T' to allow a bit of fuzziness with respect to how much of the visually distinct indicator for overlap needs to be inside of the geometric shape before the image may be captured. In other words, the visually distinct indicator may not need to fit exactly inside the geometric shape before the image can be captured. In some embodiments, the stitching module 209 instructs the user interface module 211 to generate a progress status bar on the user interface to indicate an extent of overlap occurring between the previously captured image and the current preview image until the image overlap threshold is met. In other embodiments, the stitching module 209 sends a capture command to the client device 115 to capture the image responsive to the overlap satisfying the image overlap threshold. The stitching module 209 uses a distance measure function along with the similarity function for determining when to capture the image. The distance measure function represents a sum of all similarity measures 'S' from image $F_0$ (i.e., $S_0$) to image $F_i$ (i.e., $S_i$) and may be represented as dist $(S_i)$. The distance measure function determines how close the two images $F_0$ and $F_i$ are to each other. The distance measure function determines whether the similarity measure $S_i$ is within the tolerance value 'T' of similarity value 'V' such that the following formula (V−T) <dist $(S_i)$<(V+T) is satisfied. If it is satisfied, then the stitching module 209 sends a capture command to the client device 115 to capture the image. As the distance measure function dist $(S_i)$ approaches to being within the tolerance value 'T', the distance measure function dist $(S_i)$ can be used to produce a value which may be used to represent the visually distinct indicator for overlap getting closer to the geometric shape to fit inside within the bounded region of the geometric shape. For example, this may translate into the visually distinct indicator for overlap appearing less and less transparent on the user interface of the client device 115.

Figure 18:
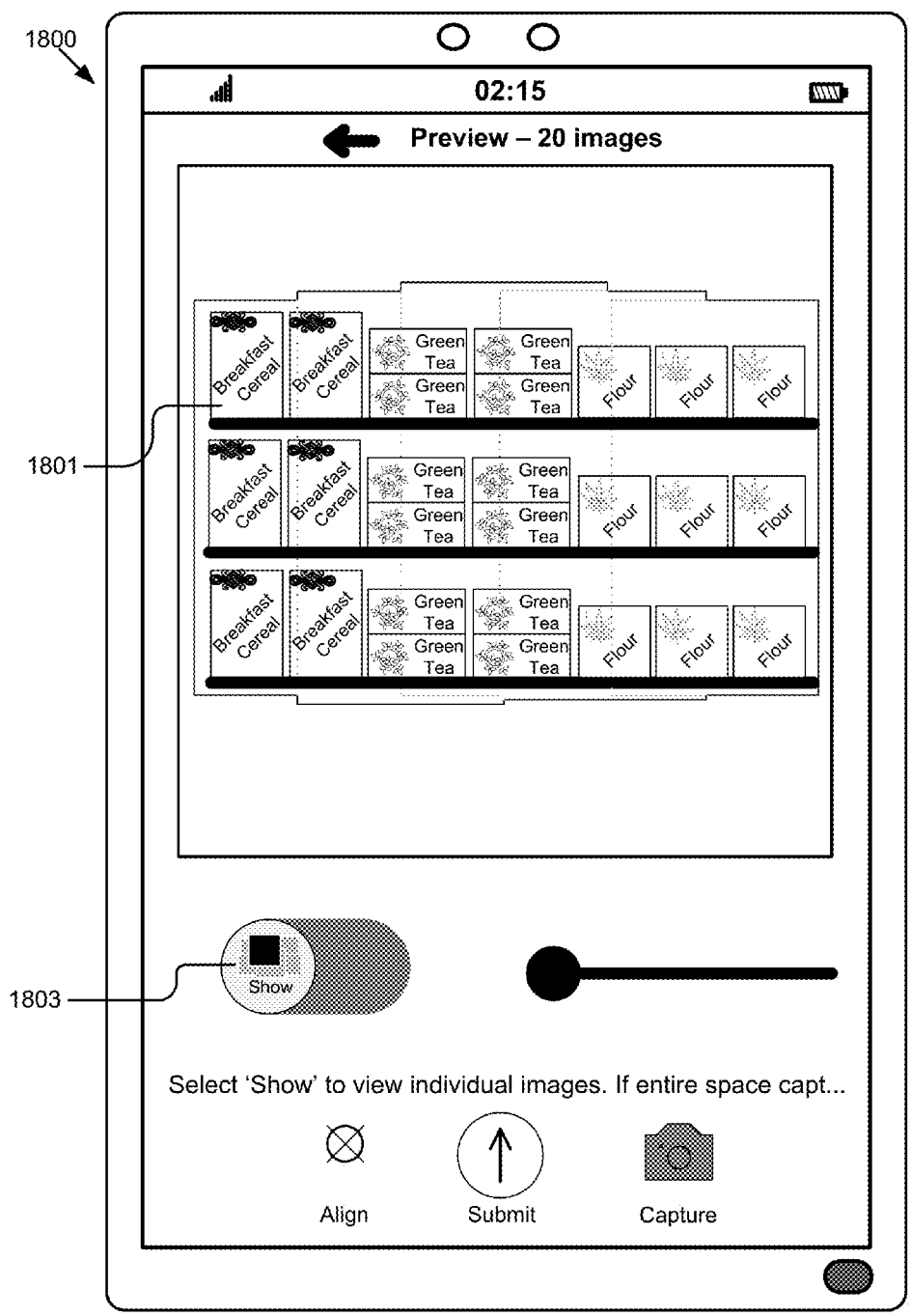
FIG. 18 shows a graphical representation of another embodiment of the user interface displaying a stitched image.

In some embodiments, the image recognition application 103 receives subsequent captured images following a first captured image of an object of interest with little to no tilt between the images. In FIG. 18, the image recognition application 103 instructs the user interface module 211 to generate a user interface 1800 to present the stitched image 1801 to the user and a button 1803 for showing the individual images. The overlapping images with little to no tilt may be expected by the stitching algorithm for creating a high resolution linear panoramic image.

In some embodiments, the image recognition application 103 receives gyroscopic data (e.g. from orientation sensors 245) including tilting of the client device 115 in any of the three axes of orientation. For example, the angle of rotation in the X axis is defined by the pitch parameter and the angle of rotation in the Z axis is defined by the roll parameter. The gyroscopic data can be generated by orientation sensors 245 such as gyro sensors included within the client device 115 may measure an angle of rotation along the X axis and Z axis. The image recognition application 103 determines whether the client device 115 is tilting in one of the axes of orientation when pointed at the object of interest based on the gyroscopic data for the X axis and Z axis and computationally for the Y axis using the yaw computation module 213. The user interface module 211 and yaw user interface module 217 generate a visually distinct indicator for tilt on the user interface of the client device 115 responsive to the tilting of the client device 115 in one or more of the axes. The position of the visually distinct indicator for tilt on the user interface may be coupled to the movement of the client device 115 in such a way that it can indicate through feedback when there is a tilt associated with the client device 115 in any of the three axes.

Figure 19:
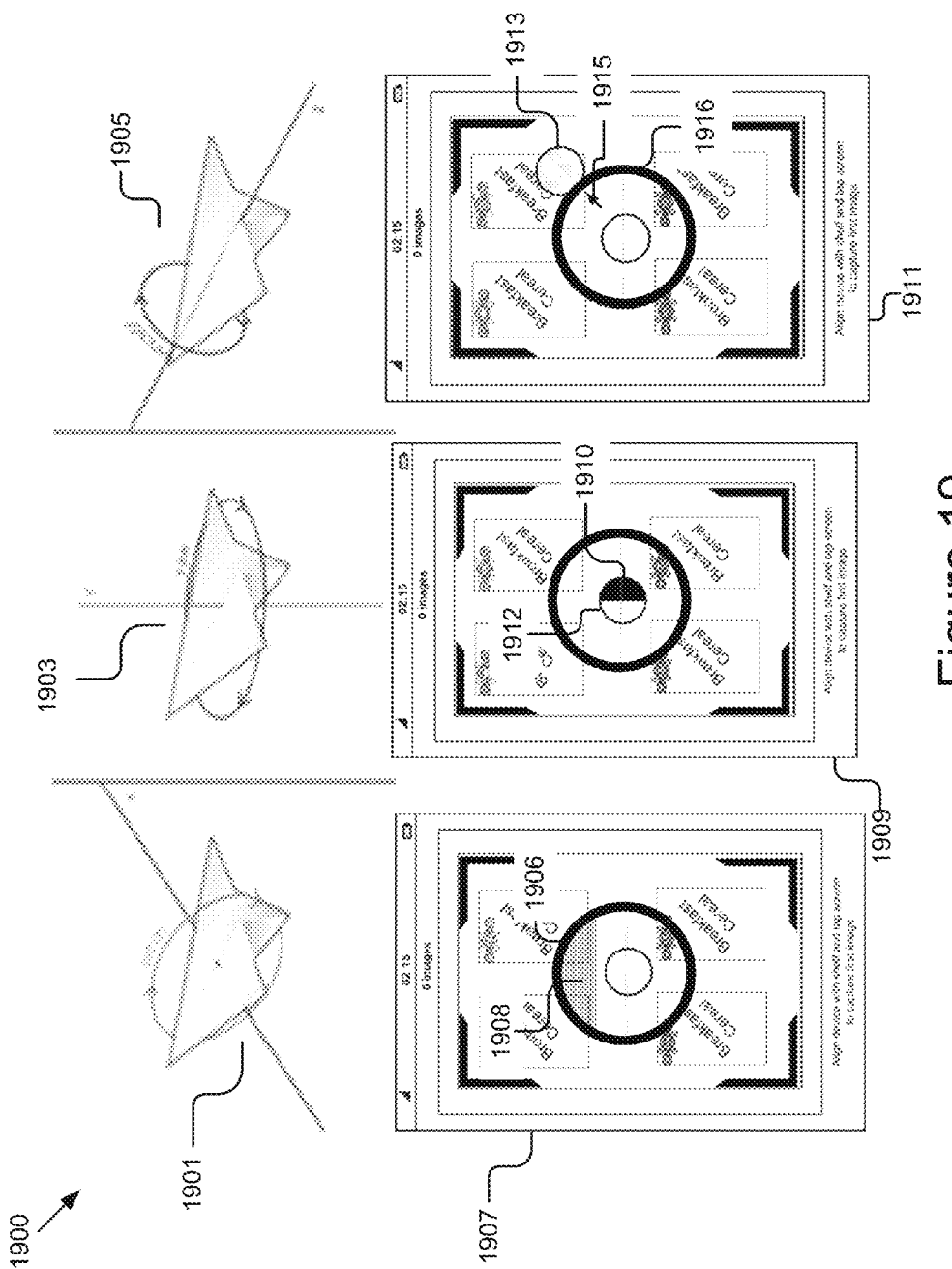
FIG. 19 shows a graphical representation of one embodiment of a user interface for three different tilt errors.

As shown in FIG. 19, the graphical representation 1900 illustrates three different user interfaces 1907, 1909 and 1911 for displaying tilt error along each of the three axes, respectively; and collectively. The pitch error 1901 along the X axis may be shown on the user interface 1907 as a horizontal eyelid indicator 1908 present inside the larger concentric circle 1906. As the pitch error 1901 increases, a greater portion of the larger concentric circle 1906 will be covered by the horizontal eyelid indicator 1908. As the pitch error 1901 decreases, a smaller portion of the larger concentric circle 1906 will be covered by the horizontal eyelid indicator 1908. The yaw error 1903 along the Y axis may be shown on the user interface 1909 as a vertical eyelid indicator 1910 present inside the smaller concentric circle 1912. As the yaw error 1903 increases, a greater portion of the smaller concentric circle 1912 will be covered by the vertical eyelid indicator 1910. As the yaw error 1903 decreases, a smaller portion of the smaller concentric circle 1912 will be covered by the vertical eyelid indicator 1910. The roll error 1905 along the Z axis may be shown on the user interface 1911 as a ball indicator 1913 outside of the larger concentric circle 1916 and an arrow 1915, oriented towards the ball indicator 1913, inside the larger concentric circle 1916. As the roll error increases the ball indicator 1913 moves along the outside of the larger concentric circle 1916 and the arrow 1915 continues to track the ball indicator 1913. As the roll error decreases the ball indicator 1913 moves along the outside of the larger concentric circle 1916 towards the top of the larger concentric circle 1916 and the arrow 1915 continues to track the ball indicator 1913. All three of these different user interfaces may be presented separately on the user interface or in different combinations together on the same user interface. Moreover, it should be understood that the different interface components may alternatively be used to indicate any of yaw, pitch and roll.

Figure 20:
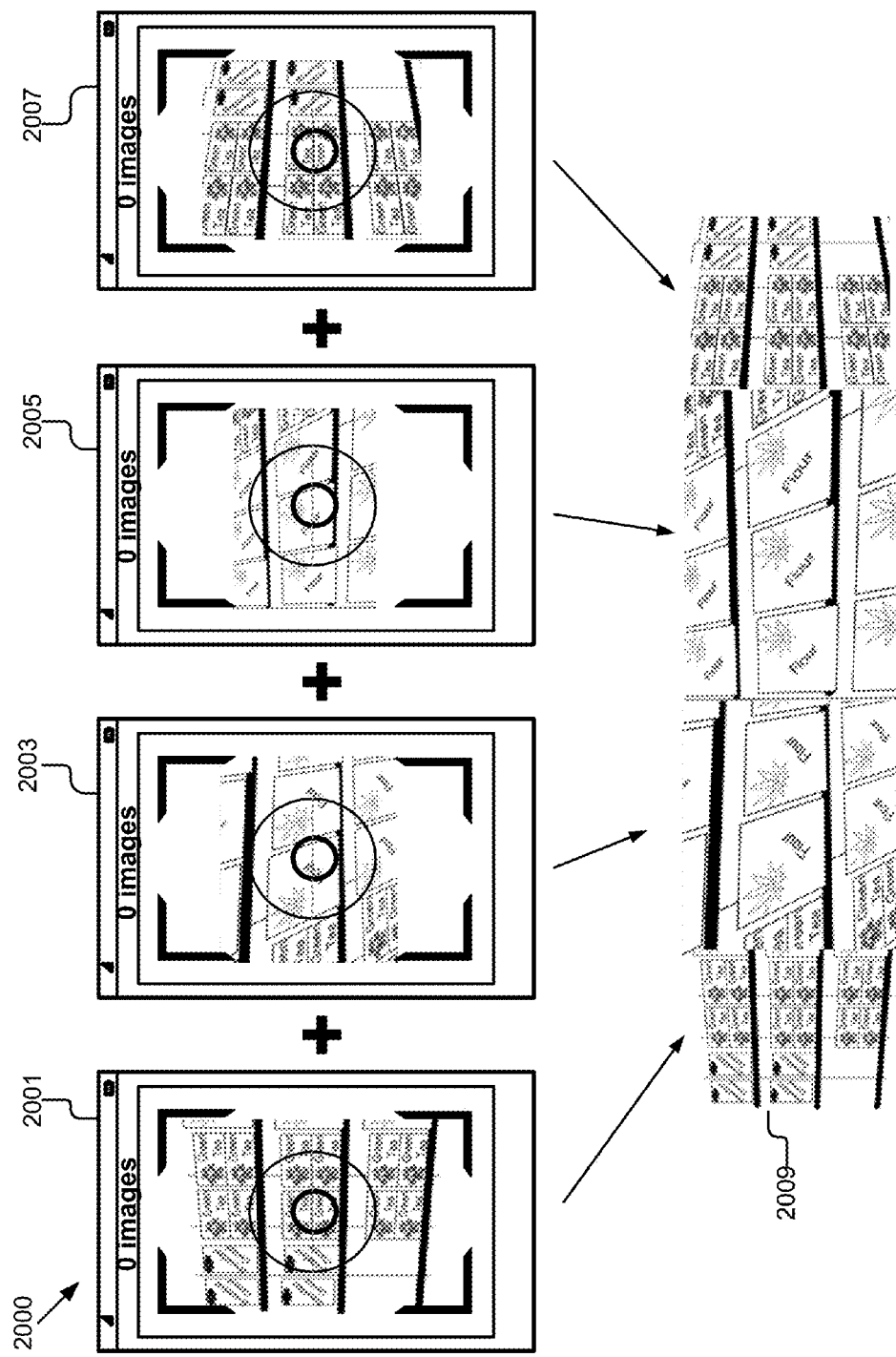
FIG. 20 shows a graphical representation of one embodiment of a stitched image with yaw error present.

As shown in the example of FIG. 20, the graphical representation 2000 illustrates how a client device 115 introduces varying levels of yaw error. Images of product shelves are received by the image recognition application 103. A first image 2001, a second image 2003, a third image 2005 and a fourth image 2007 are all received by the image recognition application 103 with varying levels of tilt error. If the images 2001, 2003, 2005 and 2007 are not retaken, when the stitching module 209 pieces the first image 2001, the second image 2003, the third image 2005 and the fourth image 2007 together into a high resolution linear panoramic image, a varying degree of distortion is introduced into the resulting stitched image 2009. Orientation sensors 245, that may be in the form of internal accelerometers or other sensors on the client device 115 can detect errors in the pitch and roll and outputs of the orientation sensors 245 can be used to correct the pitch and roll errors before the images are presented in the user interface module 211.

Figure 21:
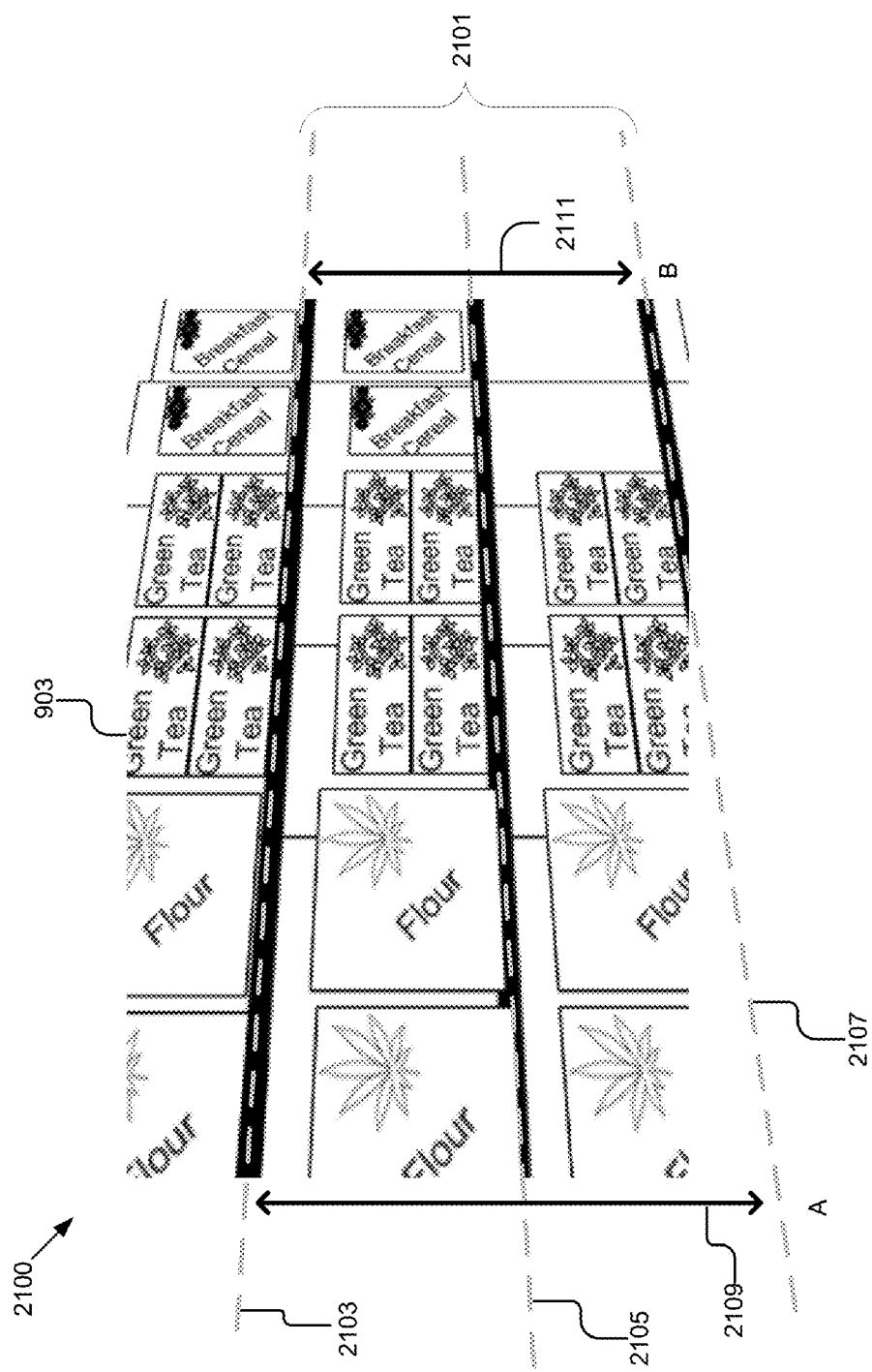
FIG. 21 shows a graphical representation of one embodiment of line detection and parameterization computations.
Figure 22:
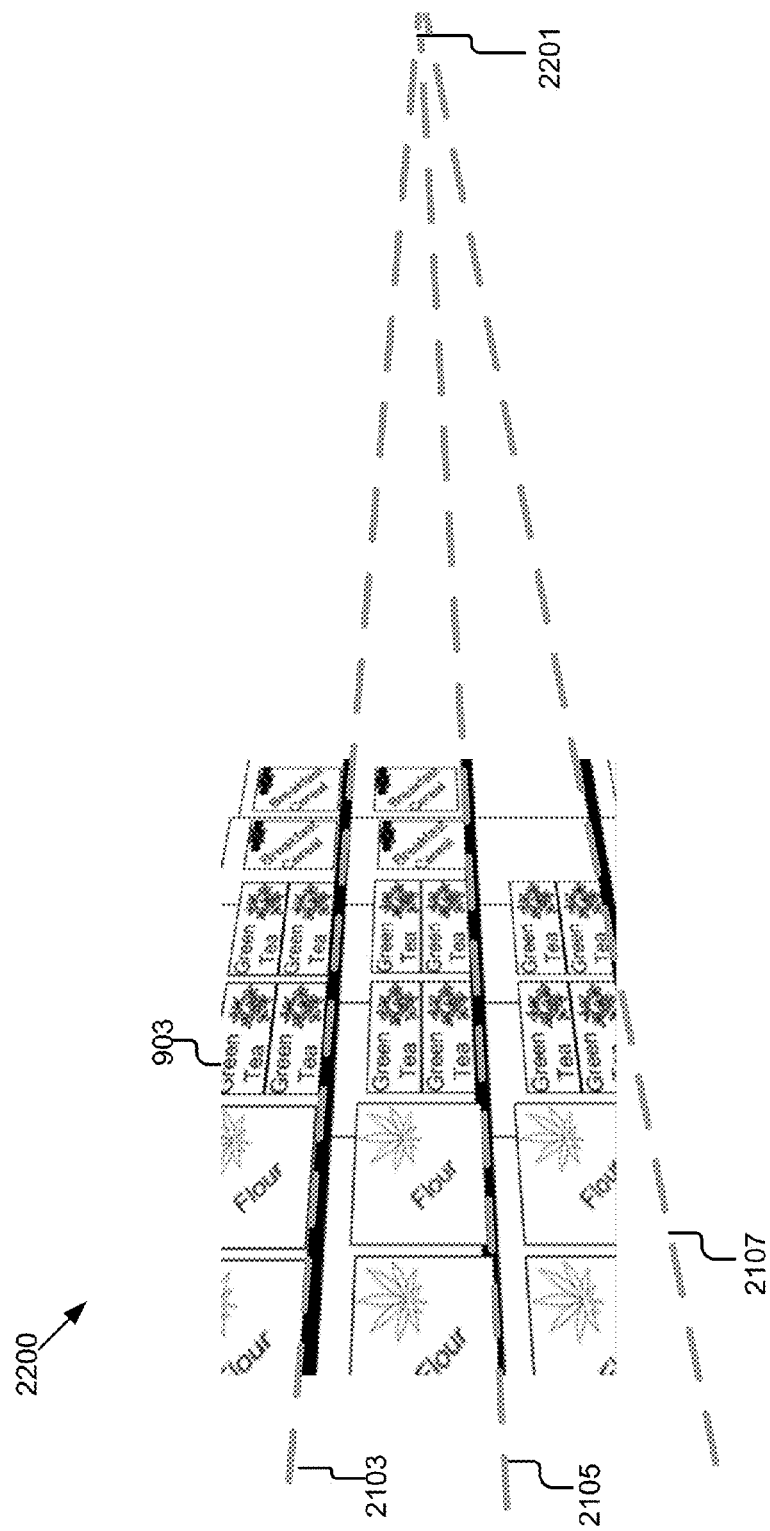
FIG. 22 shows a graphical representation of another embodiment of line detection and a vanishing point calculation.

As shown in example of FIG. 21, the graphical representation 2100 illustrates a method of performing line detection. The yaw computation module 219 analyzes an image 903 to detect a subset of lines 2101. The yaw computation module 219 needs at least two detected lines, in this example a top line 2103 and a bottom line 2107 are sufficient and a middle line 2105, while detected, is not necessary for the yaw computation. The lines 2101 may be detected by any method, one example being a Hough transform. In the image, the top line 2103 and bottom line 2107 are non-parallel lines because of distortion from a yaw error, even though in the original scene the two lines would be parallel. A height between lines 2103 and 2107 at point A 2109 is detected and a height between lines 2103 and 2107 at point B 2111 are determined in the yaw computation module 219. The lines 2103 and 2107 may be parameterized by determining start points and end points for each line or point and slope determination for each line. Referring now also to FIG. 22, the bundle of lines, 2103, 2105 and 2107 are shown extended beyond the image to determine a vanishing point 2201, The vanishing point 2201 may be sent to the distortion correction module 215 for distortion correction of the image by calculating a de-skewing transform based on the vanishing point 2201. Using the de-skewing transform, the distortion correction module 215 may use image processing to perform distortion correction of the image using the de-skewing transform. In alternative embodiments, the vanishing point 2201 may be saved in data storage 243 for other purposes.

Figure 23:
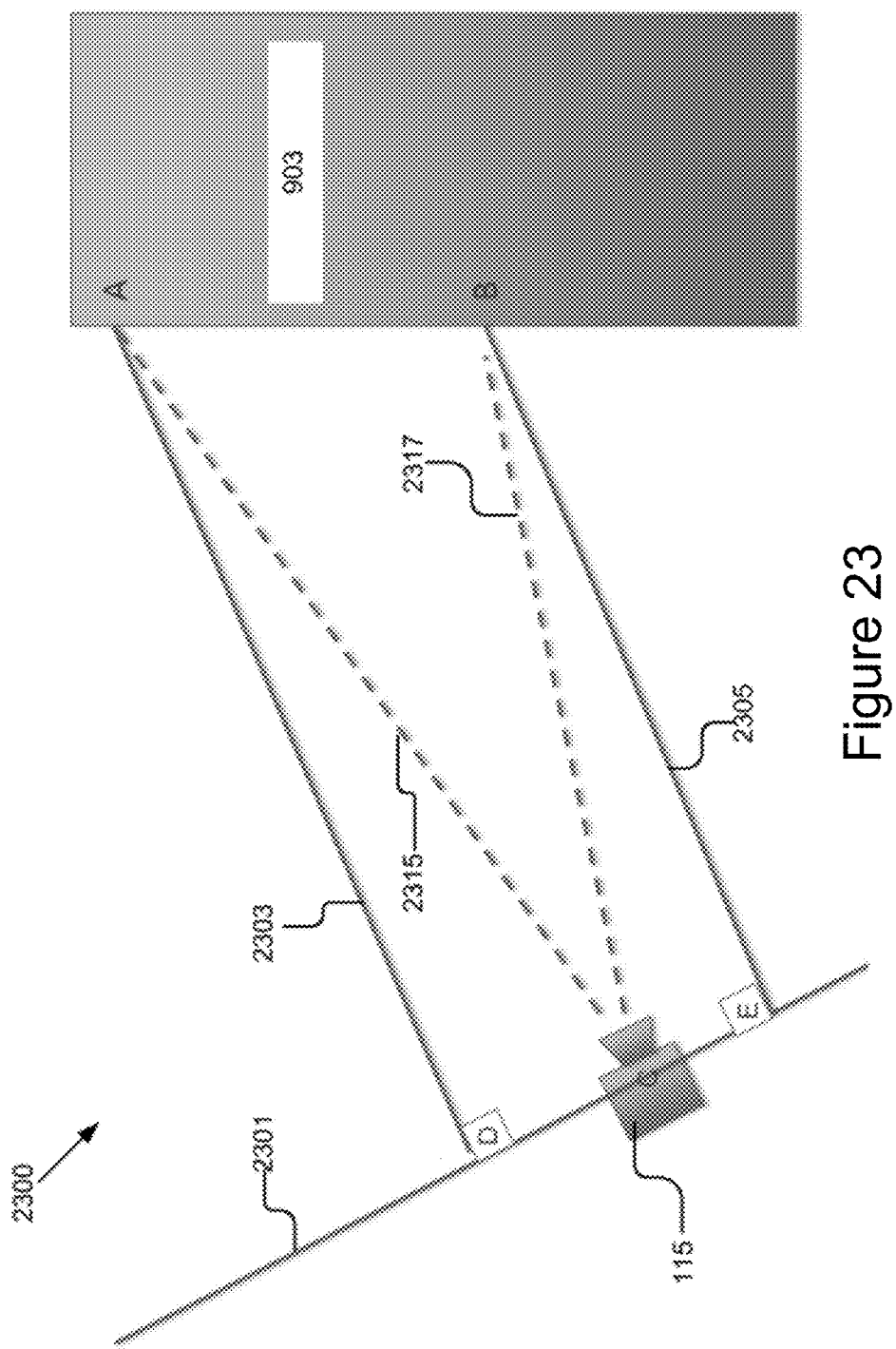
FIG. 23 shows a graphical representation of one embodiment of length calculation of an image.

As shown in the example of FIG. 23, the graphical representation 2300 illustrates a diagram for calculating the distances after line detection and parameterization has been calculated. At client device 115, an image is taken of a shelf 903. A lens plane 2301 is determined based on the direction of the lens and a point A and point B are determined using line detection and parameterization as described above with reference to FIG. 22. The client device 115 point C can be used to determine a length $L_{CA}$. 2315 between C and A. The client device 115 (point C) can be used to determine length $L_{CB}$ 2317 between point C and point B. The point D and point E have respective lengths $L_{DA}$ 2303 and $L_{EB}$ 2305. The lengths $L_{DA}$ 2303 and $L_{EB}$ 2305 are inversely proportional to heights at point A and point B from FIG. 21. The relative lengths $L_{CA}$ 2315 and $L_{CB}$ 2317 are the same as $L_{DA}$ 2303 and $L_{EB}$ 2305. The value of $L_{CA}$ 2315 can be determine by normalizing $L_{CB}$ 2317 to 1 ($L_{CB}$=1). Then $L_{CA}$ 2315 is equal to the height of point A divided by the height of point B from FIG. 21 ($L_{CA}=H_B/H_A$).

Figure 24:
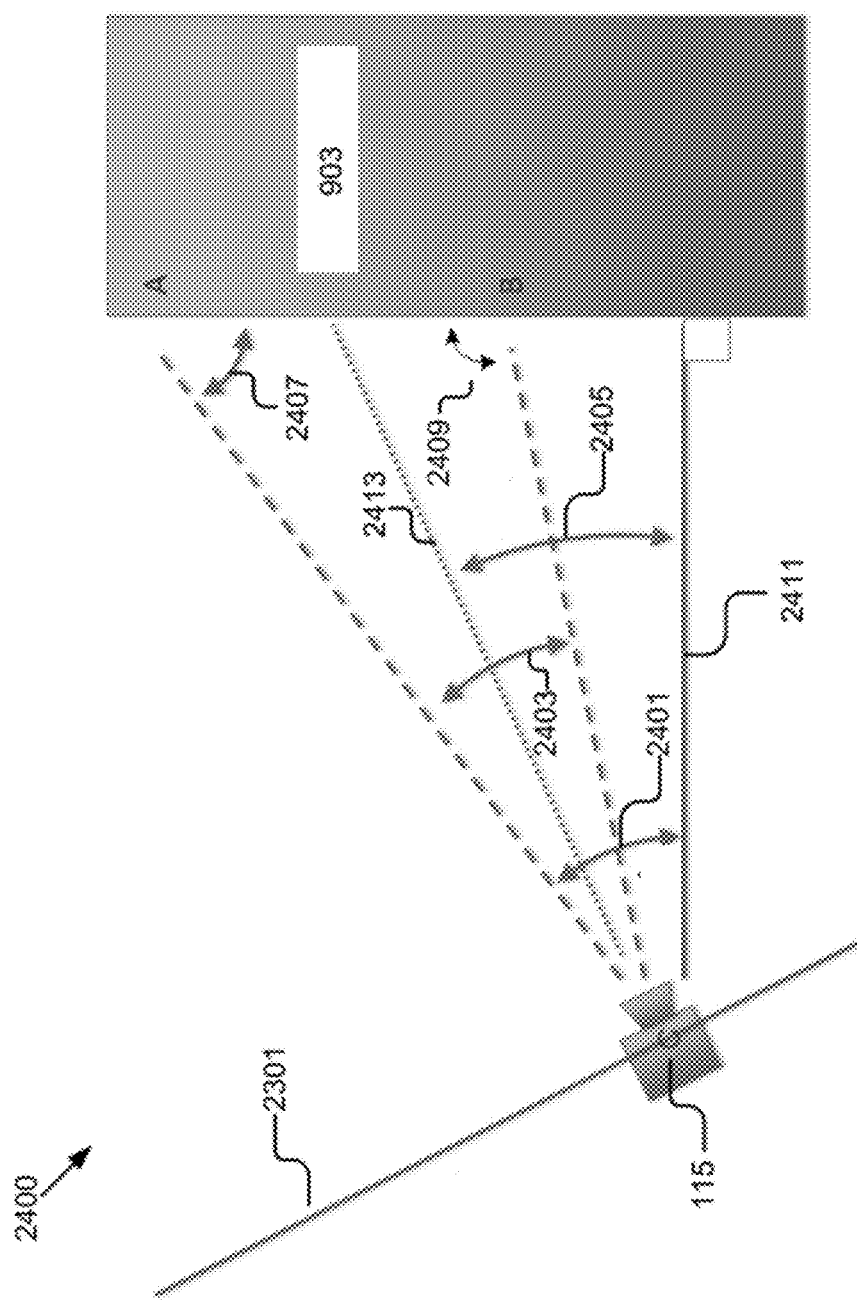
FIG. 24 shows a graphical representation of one embodiment of yaw angle calculation of an image.

As shown in the method of FIG. 24, the graphical representation 2400 illustrates one embodiment of determining a yaw angle. The length from client device 115 at point C to point A and point B were determined as described above with reference to FIG. 23. Using those determined lengths, a length $L_{AB}$ may be determined. Angle A ($\theta_A$) 2407 is the angle between the shelf 903 the line between point C and point A, Angle B ($\theta_B$) 2409 is the angle between the shelf 903 and the line between point C and point B. Angle D ($\theta_D$) 2401 is the angle between a perpendicular line 2411 extending from shelf 903 to point C and the line from point C to point A. Angle field of view ($\theta_{FOV}$) 2403 is the angle between the line from the point C to point A and the point C to point B. Angle yaw ($\theta_{yaw}$) 2405 is the angle between the perpendicular line 2411 and the mid-point line 2413 extending from point C to the mid-point between point A and point B. By using trigonometry a value for the angle yaw ($\theta_{yaw}$) 2405 may be determined. By the law of cosines the length from point A to point B ($L_{AB}$) equals the square root of the length $L_{CA}$ 2315 squared plus the length $L_{CB}$ 2317 squared plus two multiplied by $L_{CA}$ 2315 multiplied by $L_{CB}$ 2317 multiplied by the cosine of angle field of view ($\theta_{FOV}$) 2403 as shown in the equation: $L_{AB}=\text{sqrt}[L_{CA}^2+L_{CB}^2+2\,L_{CA}\,L_{CB}\cos\theta_{FOV}]$. By the law of sines sin of angle A ($\theta_A$) 2407 divided by the length from client device 115 to point B ($L_{CB}$) equals the sin of the of angle field of view ($\theta_{FOV}$) 2403 divided by the length from point A to point B ($L_{AB}$). As shown in the equation: $\sin\theta_A/L_{CB}=\sin\theta_{FOV}/L_{AB}$. Manipulating that equation creates the equation: $\theta_A=\arcsin[(L_{CB}/L_{AB})\sin\theta_{FOV}]$. After doing those calculations and substitutions, angle D ($\theta_D$) 2401 is equal to ninety degrees subtracted by angle A ($\theta_A$) 2407. As shown in the equation: $\theta_D=(90°-\theta_A)$. Therefore, angle yaw ($\theta_{yaw}$) 2405 may be equal to angle D ($\theta_D$) 2401 subtracted by angle field of view ($\theta_{FOV}$) 2403 divided by two. As shown in the equation: $\theta_{yaw}=\theta_D-(\theta_{FOV}/2.0)$. FIG. 24 illustrates one example embodiment of a mathematical formula for determining a yaw angle. It is appreciated that other trigonometric formulas and mathematical tools may be used in other embodiments to calculate a yaw angle.

Figure 25A:
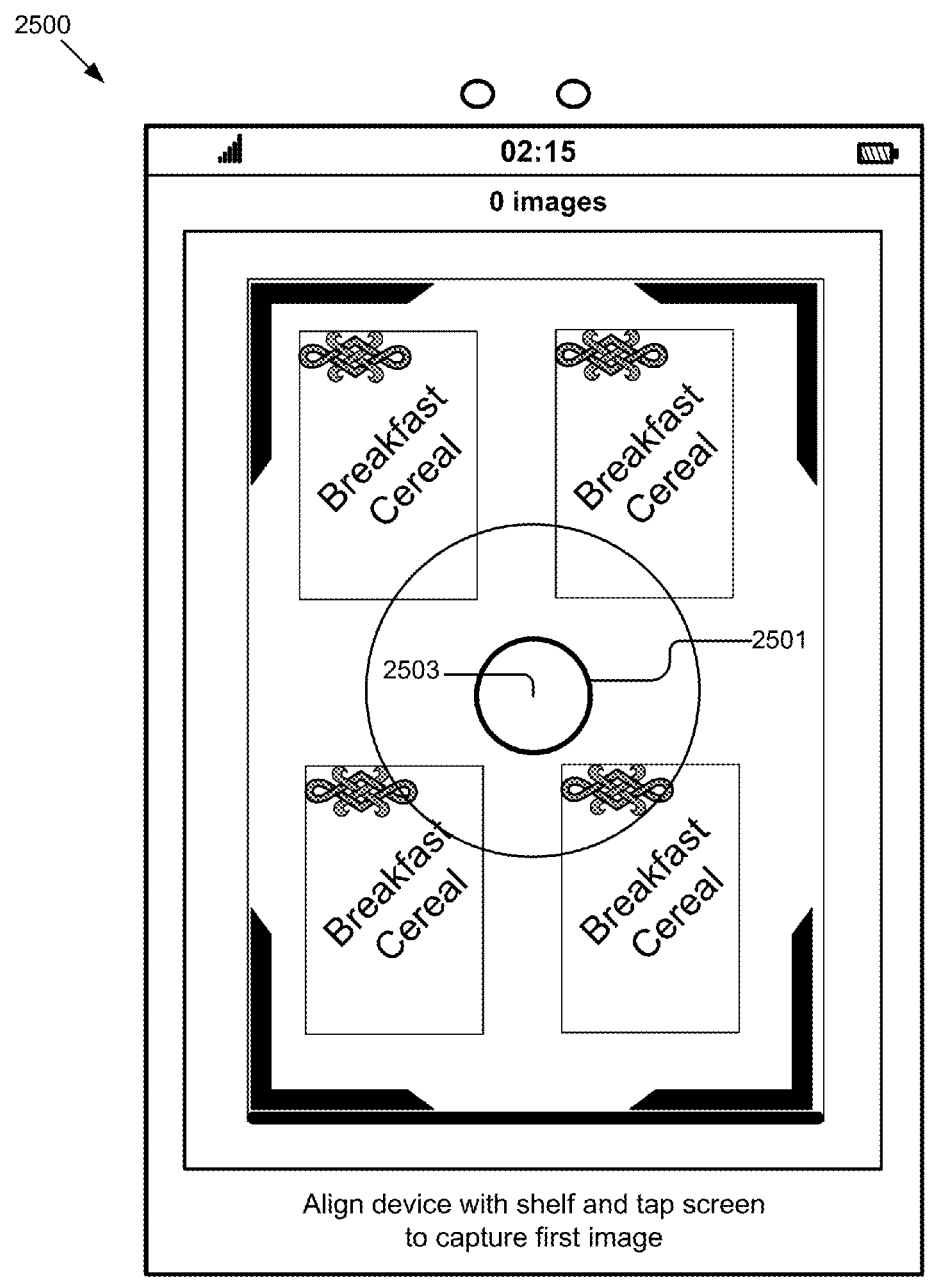
FIGS. 25A-25D show a graphical representation of a first embodiment of a yaw error indicator user interface.

As shown in the example of FIG. 25A-D, the graphical representations illustrate an embodiment of an example user interface, for yaw correction. In FIG. 25A, the graphical representation illustrates a user interface 2500 with no yaw error feedback. The user interface displays a smaller concentric circle 2501 on which a vertical eyelid indicator may appear when yaw is present. No yaw is detected in the user interface 2500 because the smaller concentric circle 2501 displays no vertical eyelid indicator data 2503.

Figure 25B:
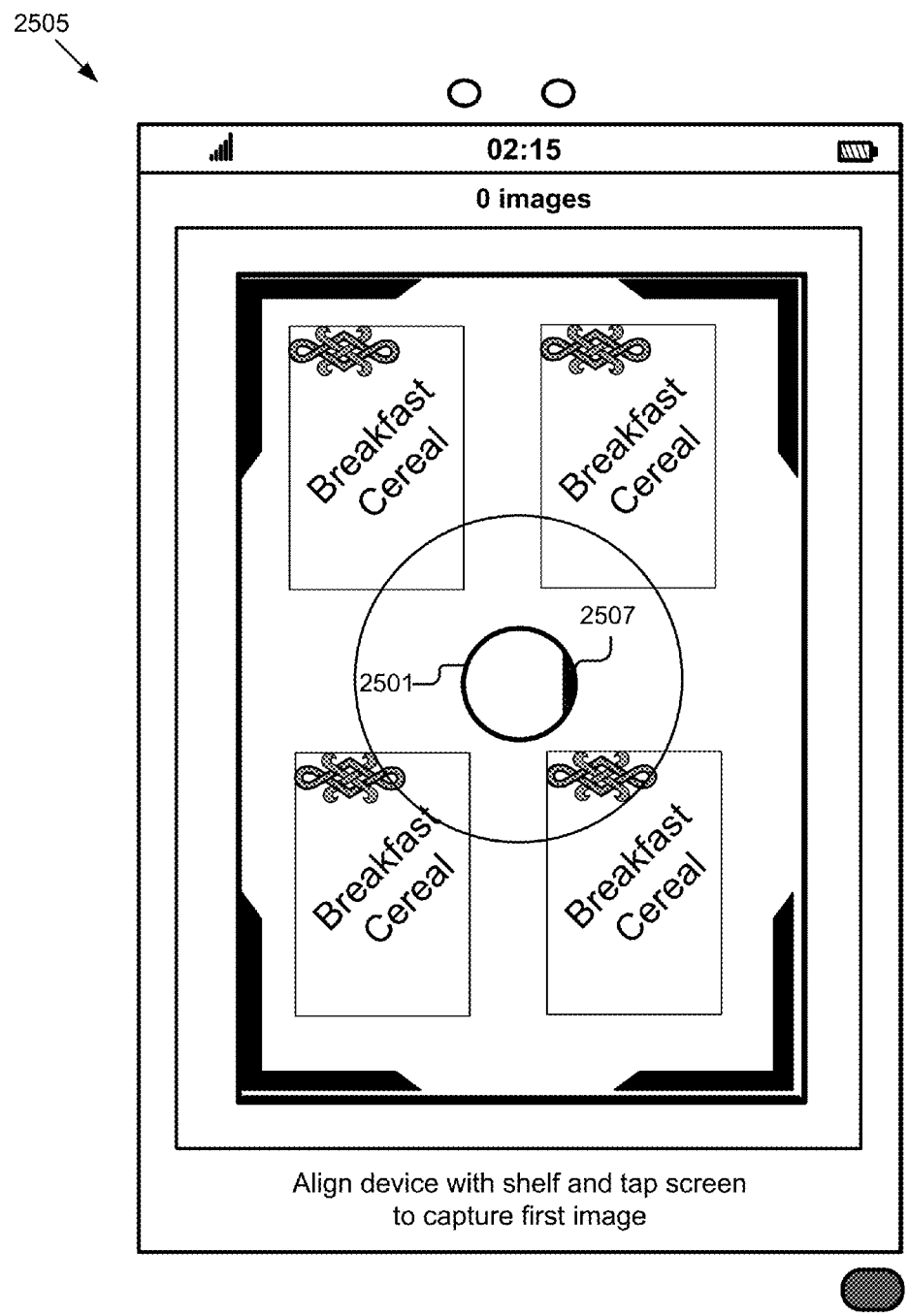
Figure 25C:
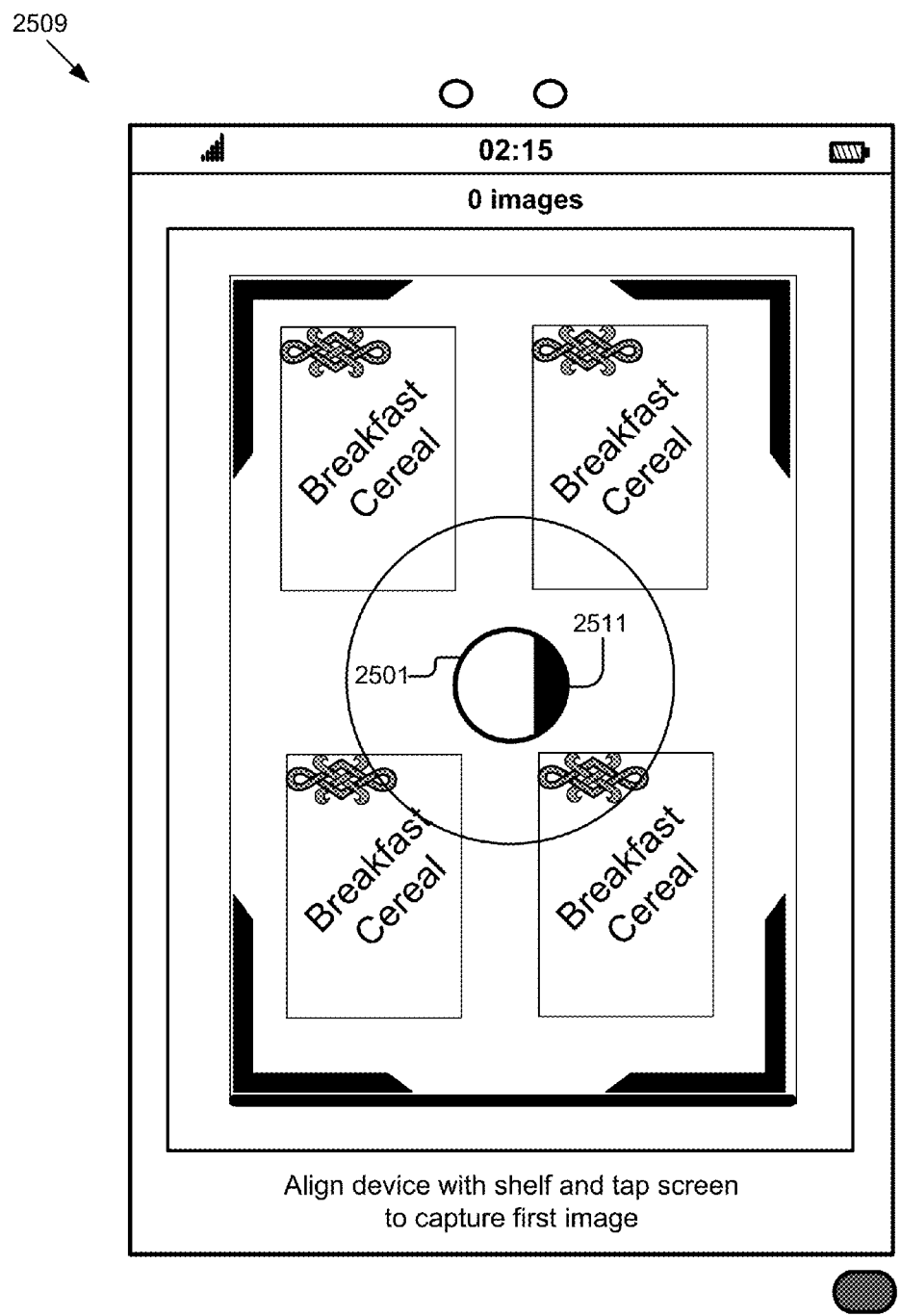
Figure 25D:
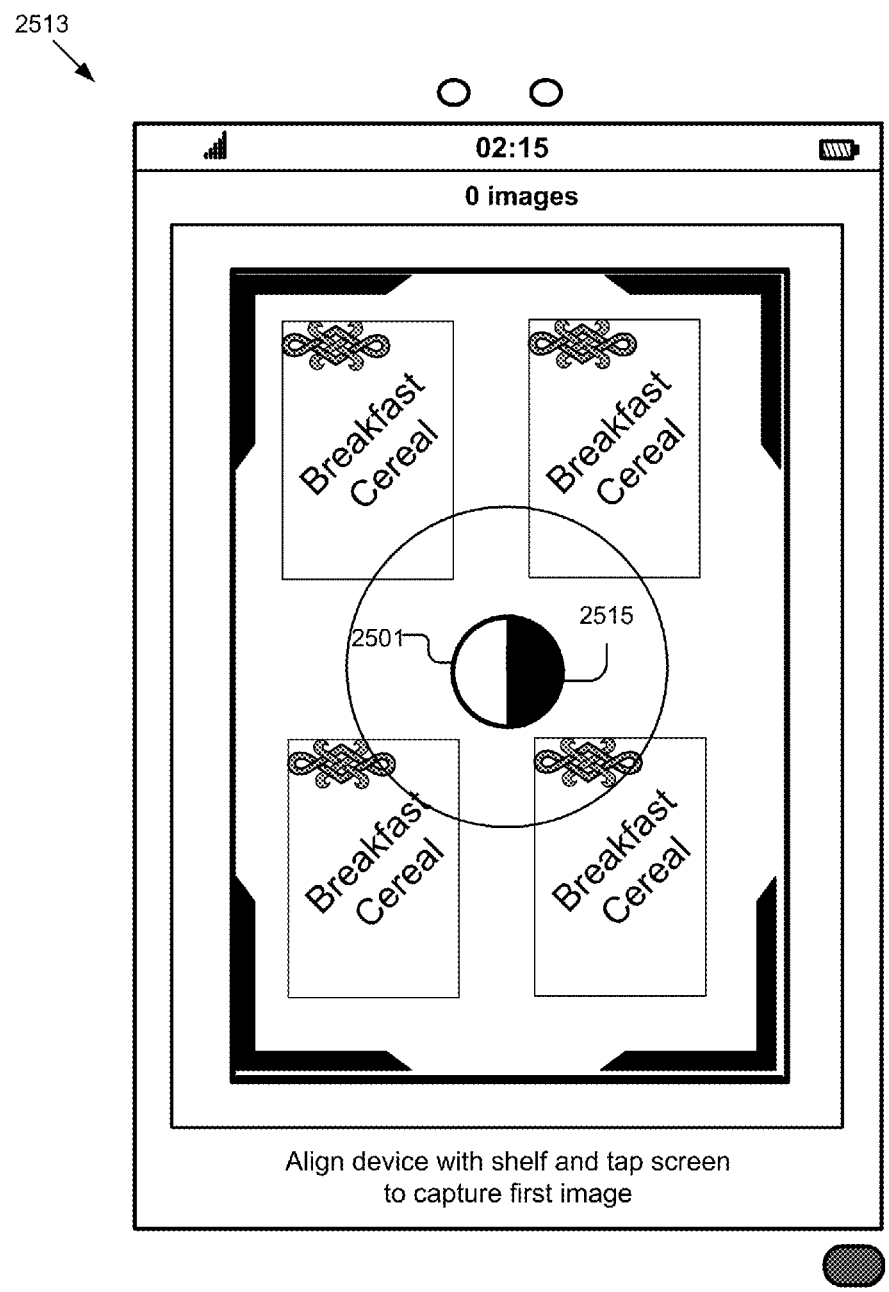

In FIG. 25B, the user interface 2505 illustrates a small yaw error feedback by showing a small portion inside of the smaller concentric circle 2501, the small portion is covered by a vertical eyelid indicator 2507 for indicating to a user that the client device 115 is angled slightly to the left side of center on the Y axis. As the user corrects this yaw error by moving the client device 115 back to the center along the Y axis, the vertical eyelid indicator 2507 will decrease and the user interface will return to the state shown in FIG. 25A. It should be understood that in some embodiments the shading could increase from left to right instead right to left as depicted in FIGS. 25B-25D. Moreover, other visual indicators other that shading such as color, crosshatching, etc. may be used in the vertical eyelid indicator 2507 to indicate the amount of yaw error.

In FIG. 25C, the user interface 2509 shows a medium yaw error feedback by showing a medium portion inside of the smaller concentric circle 2501, the medium portion is covered by a vertical eyelid indicator 2511 for indicating to a user that the client device 115 is angled to the left side of center on the Y axis. As the user corrects this yaw error by moving the client device 115 back to the center along the Y axis, the vertical eyelid indicator 2511 will decrease and the user interface will return to the state shown in FIG. 25A.

In FIG. 25D, the user interface 2513 illustrates a large yaw error feedback by showing a large portion inside of the smaller concentric circle 2501, the large portion is covered by a vertical eyelid indicator 2515 for indicating to a user that the client device 115 is angled to the left side of center on the Y axis to a large degree. As the user corrects this yaw error by moving the client device 115 back to the center along the Y axis, the vertical eyelid indicator 2515 will decrease and the user interface will return to the state shown in FIG. 25A. The vertical eyelid indicator 2515 may cover any portion of the smaller concentric circle 2501 based on the calculated yaw angle in either a left or right direction and is not limited to the three examples of a vertical eyelid indicator discussed in FIGS. 25A-D.

Figure 26A:
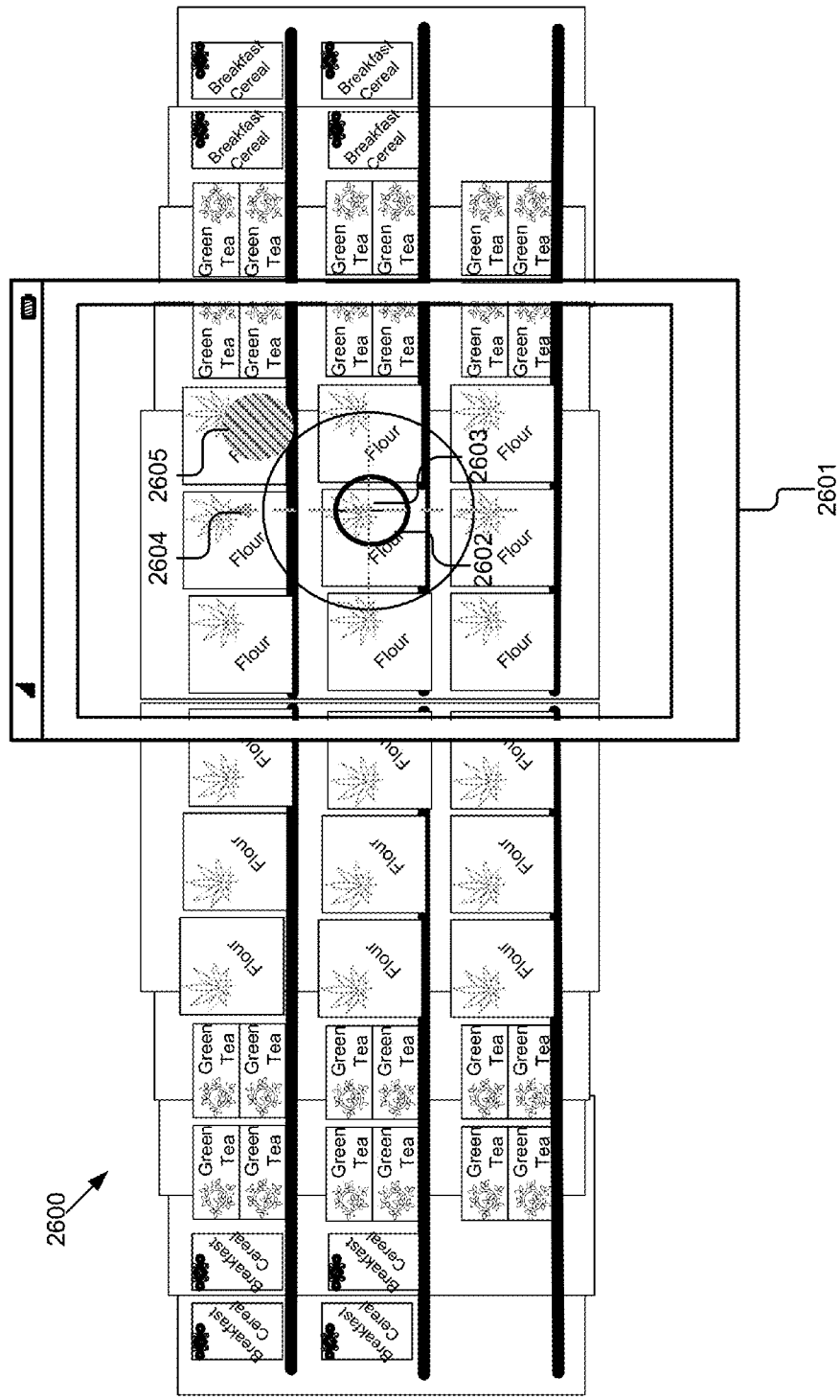
FIGS. 26A-26E show a graphical representation of a second embodiment of a yaw error indicator user interface.

As shown in the example of FIG. 26A-26E, the graphical representations illustrate an embodiment of previewing an image and displaying the yaw error on a previewed image before it is stitched with previous images. In the graphical representation the background is stitched together to illustrate examples of previous images in the panoramic image being created and the graphical user interface 2601 appears in the foreground with the user interface for yaw error on top of the foreground image. In FIG. 26A, the graphical representation 2600 illustrates a user interface with no yaw error detected, as shown by the smaller concentric circle 2602 with no vertical eyelid indicator present 2603. The example user interface also includes ball indicator 2605 to assist the user of the client device 115 in lining up the next image to correctly capture the next image necessary for stitching without any yaw error. At 2604, a y-axis is displayed about which the client device 115 may rotate to create a yaw error. As noted above, it should be understood that in some embodiments the shading for indicating the yaw error could increase from left to right instead right to left as depicted in FIGS. 26B-26E. Moreover, other visual indicators other that shading such as color, crosshatching, etc. may be used in the vertical eyelid indicator 2603 to indicate the amount of yaw error.

Figure 26B:
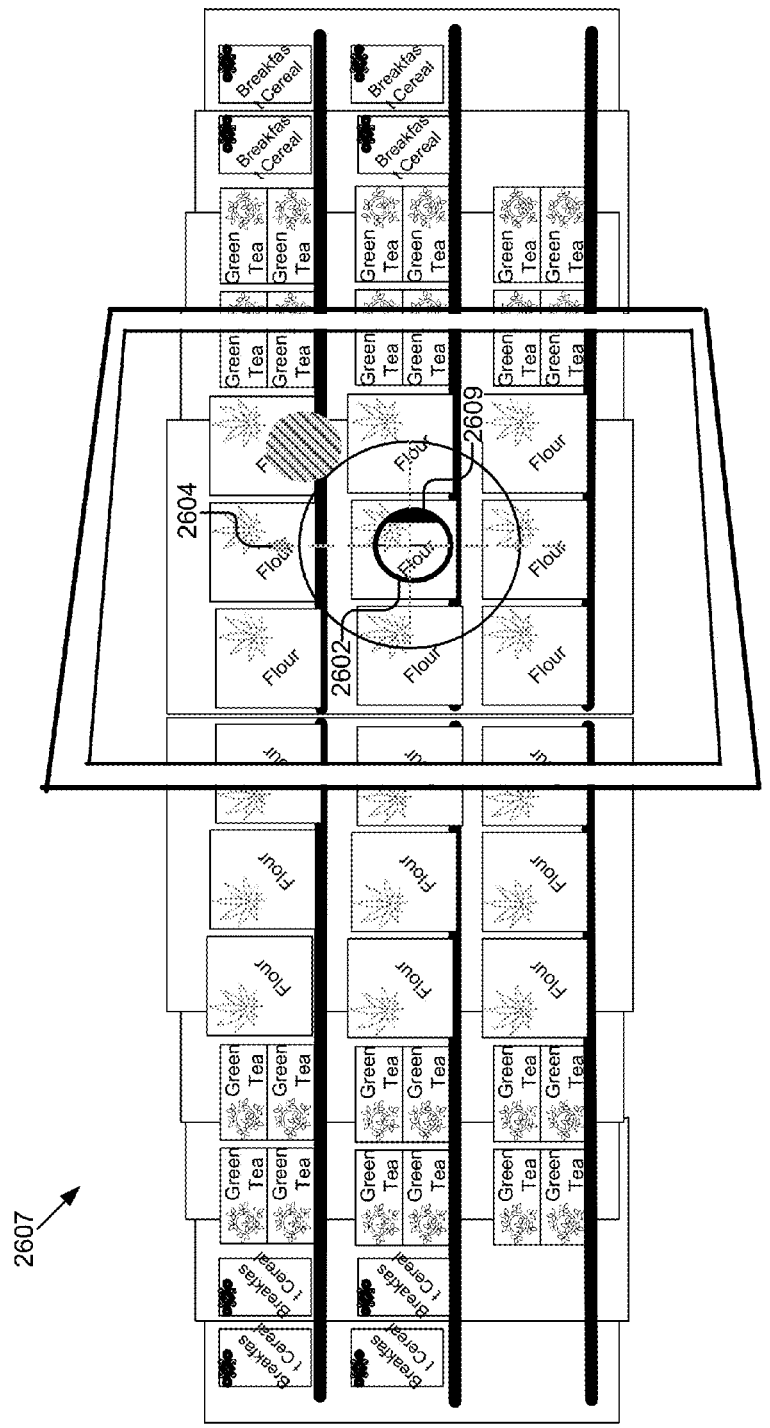
Figure 26C:
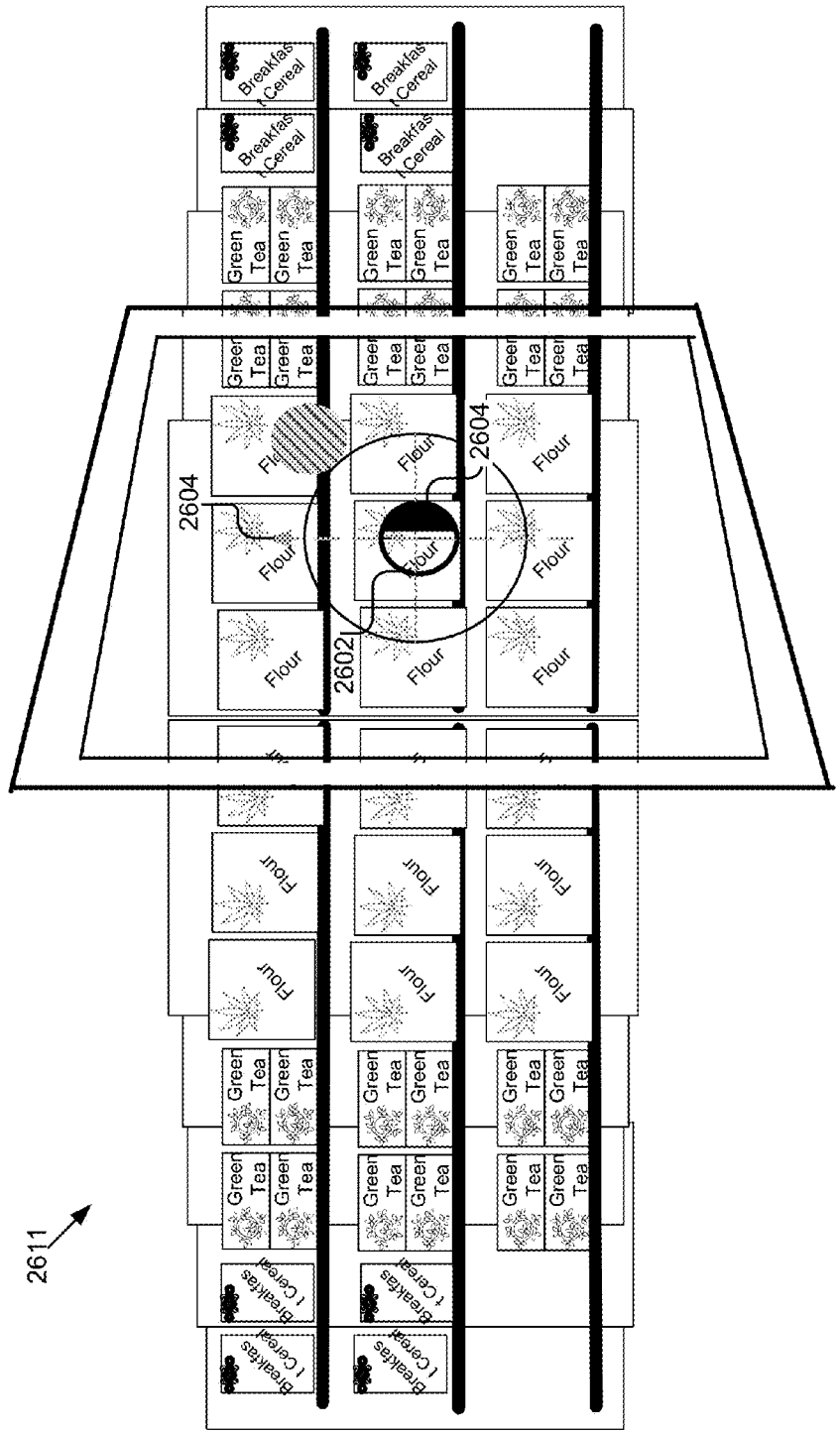

In FIG. 26B, the graphical representation 2606 illustrates a user interface with a small yaw error detected. The client device 115 is angled to the left of center along the Y axis 2604 and a vertical eyelid indicator 2609 covering a small portion of the smaller concentric circle 2602 is present. As the user rotates the client device 115 back towards the center of the Y axis 2604 and removes the yaw error, the vertical eyelid indicator 2609 will cover less of the smaller concentric circle 2602 to indicate to the user that the yaw error is decreasing In FIG. 26C, the graphical representation 2611 illustrates a user interface with a large yaw error detected. The client device 115 is angled to the left of center to a large degree along the Y axis 2604 and a vertical eyelid indicator 2613 covering a large portion of the smaller concentric circle 2602 is present. As the user rotates the client device 115 back towards the center of the Y axis 2604 and removes the yaw error, the vertical eyelid indicator 2613 will cover less of the smaller concentric circle 2602 to indicate to the user that the yaw error is decreasing.

Figure 26D:
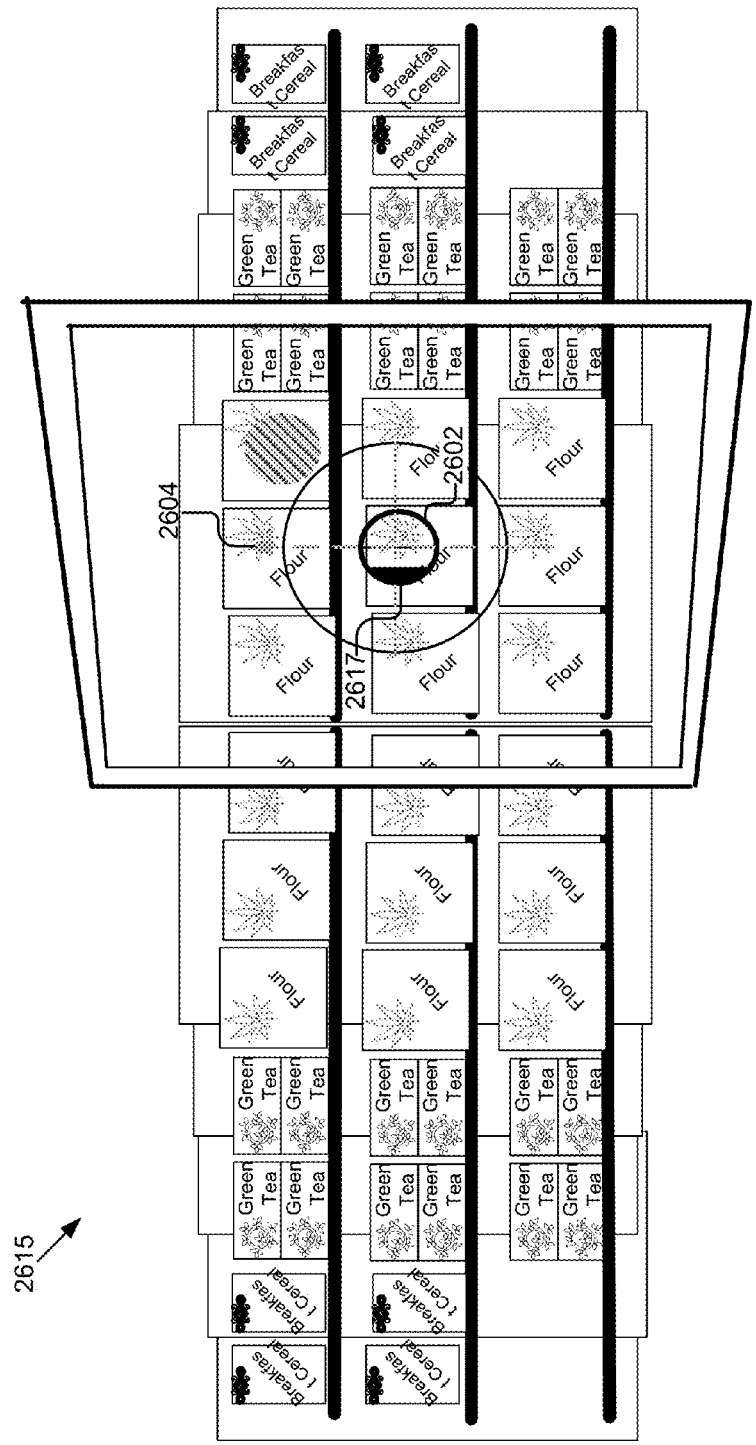

In FIG. 26D, the graphical representation 2615 illustrates a user interface with a small yaw error detected. The client device 115 is angled to the right of center along the Y axis 2604 and a vertical eyelid indicator 2617 covering a small portion of the smaller concentric circle 2602 is present. As the user rotates the client device 115 back towards the center of the Y axis 2604 and removes the yaw error, the vertical eyelid indicator 2617 will cover less of the smaller concentric circle 2602 to indicate to the user that the yaw error is decreasing.

Figure 26E:
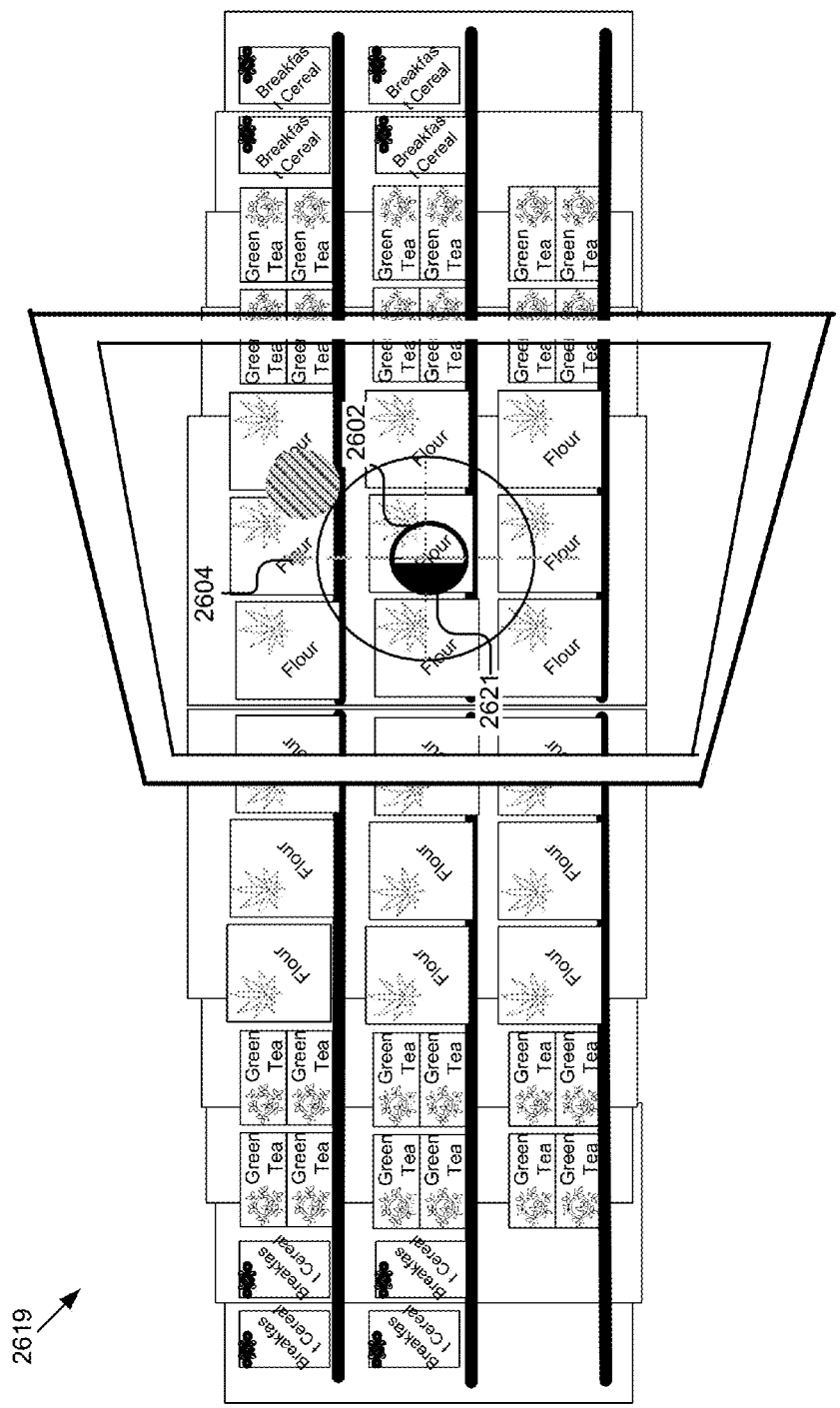

In FIG. 26E, the graphical representation 2619 illustrates a user interface with a large yaw error detected. The client device 115 is angled to the right of center to a large degree along the Y axis 2604 and a vertical eyelid indicator 2621 covering a small portion of the smaller concentric circle 2602 is present. As the user rotates the client device 115 back towards the center of the Y axis 2604 and removes the yaw error, the vertical eyelid indicator 2621 will cover less of the smaller concentric circle 2602 to indicate to the user that the yaw error is decreasing.

Figure 27:
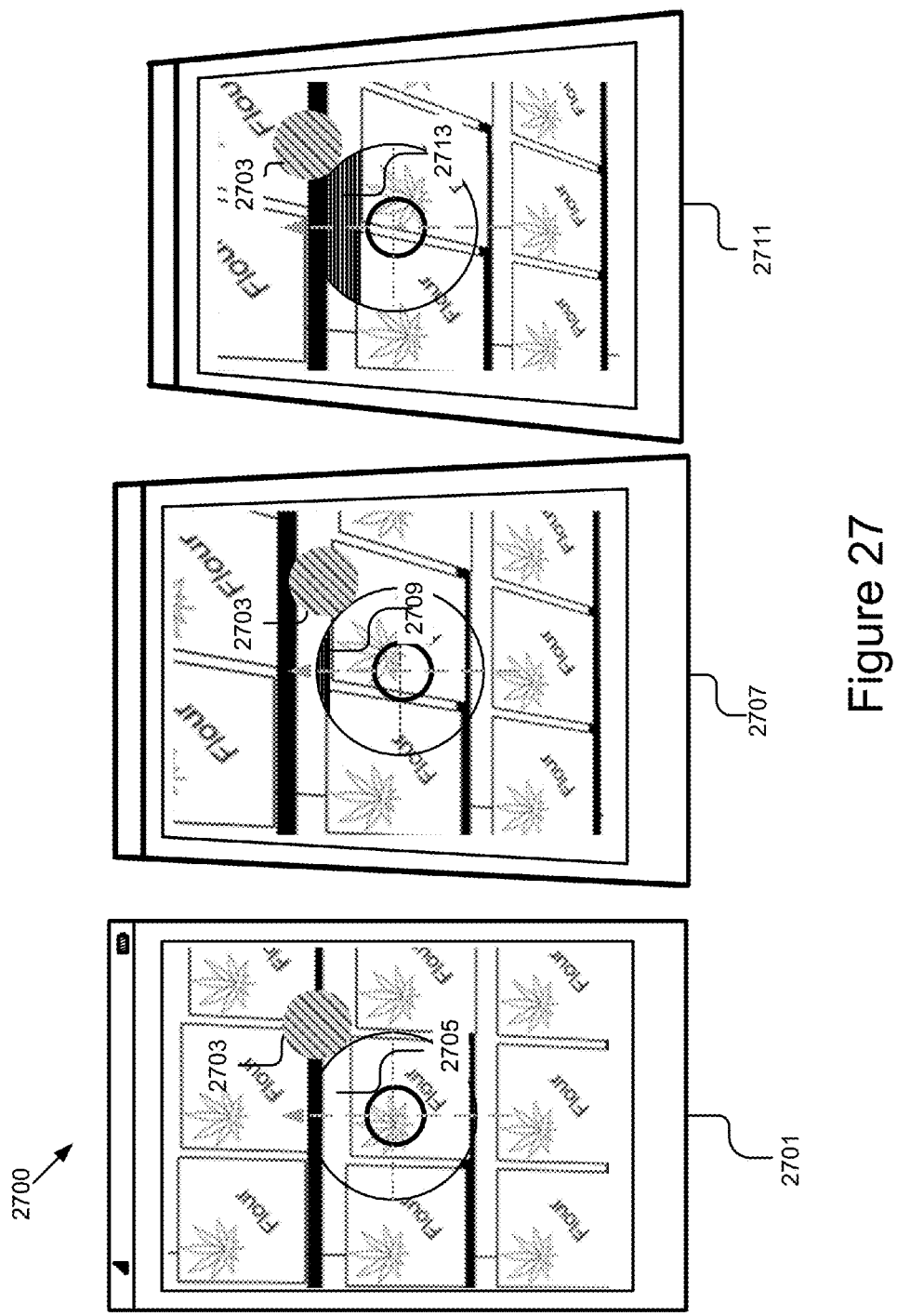
FIG. 27 shows a graphical representation of one embodiment of a pitch error indicator user interface.

As shown in the example of FIG. 27, the graphical representation 2700 illustrates a user interface displaying pitch error for feedback to a user. In the user interface a larger concentric circle is present on which a horizontal eyelid indicator may be present to indicate a pitch error to a user of the client device 115. The user interface 2701 has no horizontal eyelid indicator present 2705 indicating to the user that the pitch error is below an acceptable level. A ball indicator 2703 is also present to guide the user in taking the next image for stitching together a panoramic image. In a second example of a user interface 2707, a small amount of a pitch error is detected as the client device 115 is angled down from the X axis and a small portion of the larger concentric circle is covered by a horizontal eyelid indicator 2709 to indicate to the user of the client device 115 that a pitch error is present. As the user tilts the client device angled up from the X axis and reduces the pitch error, the horizontal eyelid indicator may reduce the portion of the larger concentric circle that is covered. In a third example of a user interface 2711, a large amount of pitch error is detected as the client device 115 is angled down from the X axis and a large portion of the larger concentric circle is covered by a horizontal eyelid indicator 2709 to indicate to the user of the client device 115 that a pitch error is present. As the user tilts the client device angled up from the X axis and reduces the pitch error, the horizontal eyelid indicator may reduce the portion of the larger concentric circle that is covered. As the pitch error deviates, the square-ness of the image decrease and a portion of the image is distorted based on the pitch error. If the pitch error is not reduced, these distorted images when stitched together will create a distorted panoramic image. The horizontal eyelid indicator 2709 may cover any portion of the larger concentric circle based on the pitch angle in either a up or down direction along the X axis and is not limited to the examples of a horizontal eyelid indicator 2709 discussed in FIG. 27.

Figure 28:
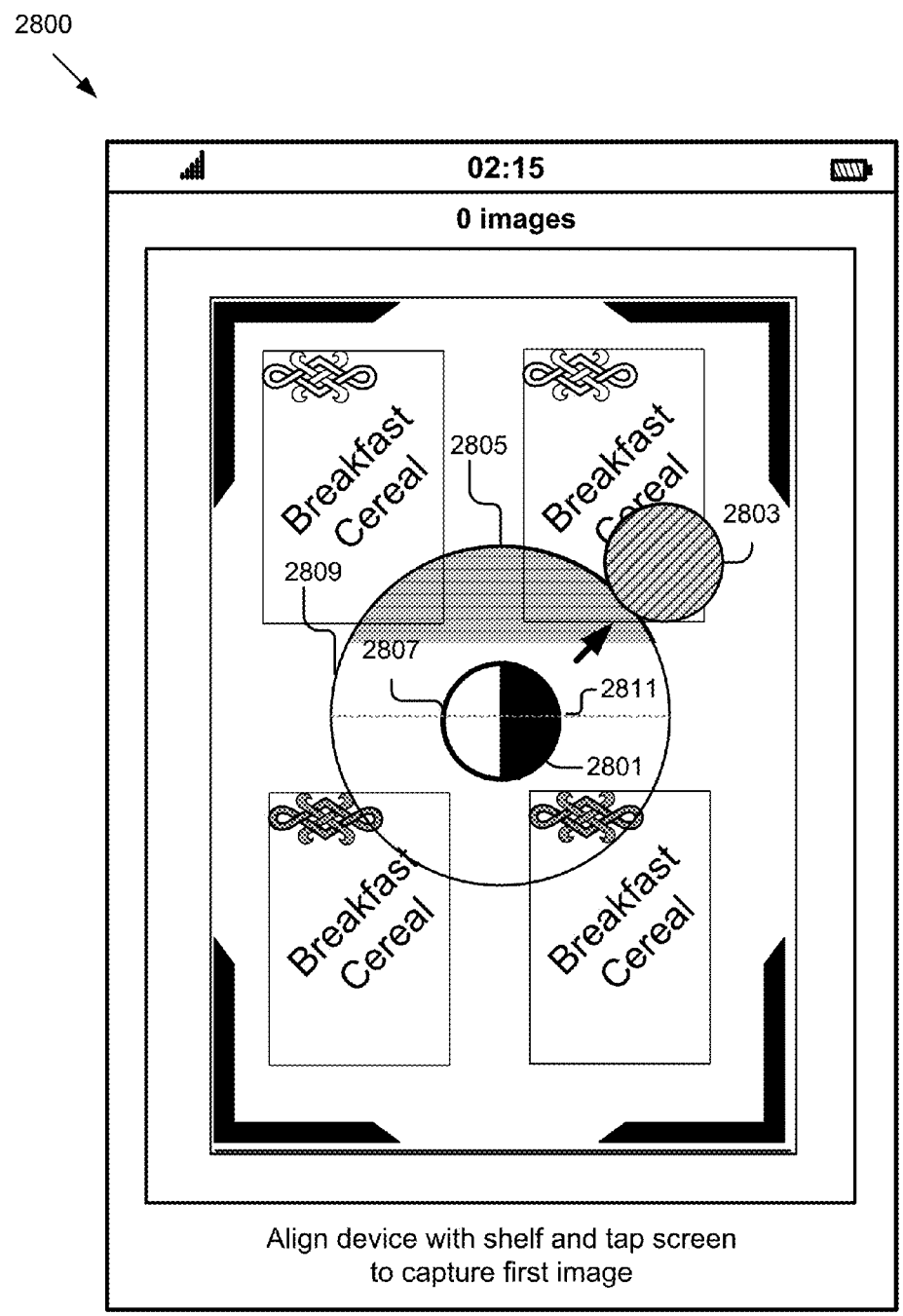
FIG. 28 shows a graphical representation of one embodiment of a user interface incorporating three different tilt indicators.

In FIG. 28, the graphical representation 2800 illustrates an example user interface that may include indicators for yaw, pitch and roll indicators. A vertical eyelid indicator 2801 may be present inside of a smaller concentric circle 2807 to indicate to a user that a yaw error is detected in the preview image. As the user reduces the yaw error, the vertical eyelid indicator 2801 may cover a smaller portion of the smaller concentric circle 2807 and as the user increases the yaw error, the vertical eyelid indicator may cover a larger portion of the smaller concentric circle 2807. Haptic feedback (not shown) may also be incorporated into the user interface, such that when a yaw error is detected, the client device 115 may indicate the detected error to a user through a tone, vibration or other haptic means of indication. Alternatively, the haptic feedback may indicate to a user when a yaw error is below a threshold, signaling that that user may capture an image. A horizontal eyelid indicator 2805 may be present inside of a larger concentric circle 2809 to indicate to a user that a pitch error is detected in the preview image. As the user reduces the pitch error, the vertical eyelid indicator 2805 may cover a smaller portion of the larger concentric circle 2809 and as the user increases the pitch error, the horizontal eyelid indicator may cover a larger portion of the larger concentric circle 2809. Haptic feedback may also be incorporated into the user interface, such that when a pitch error is detected, the client device 115 may indicate the detected error to a user through a tone, vibration or other means of indication. Alternatively, the haptic feedback may indicate to a user when a pitch error is below a threshold, signaling that that user may capture an image. A ball and arrow indicator 2803 may be present on the user interface to indicate roll error and as a guide for capturing the next preview image. As the roll error increases, the ball and arrow indicator 2803 may move to indicate the increase in roll error and alert the user to move the ball and arrow to a position at the top of the larger concentric circle. Alternatively, the ball indicator 2803 may be an indicator of how to align the next image in a series of images for stitching. As the user moves the smaller concentric circle 2807 towards the ball indicator 2803, the preview image necessary for the next image of stitching and the actual image the user will capture will be the same. In some embodiments, a horizontal line indicator 2811 may be present on the user interface to indicate the roll error. As the roll error increases in a direction, the horizontal line indicator 2811 rotates about the center of the smaller concentric circle 2807, indicating to the user that the roll error must be decreased. As the roll error decreases, the horizontal line indicator 2811 rotates back to towards the horizontal position, as shown in FIG. 28. In this example user interface 2800, all three indicators are present near the center of the screen for the target device. By incorporating all three indicators near the center, a user will receive feedback easier, as the user aligns the preview image to capture the next image in a series of images for panoramic stitching. By incorporating all three indicators where the user will be able to adjust based on the feedback of the indicators, higher quality images for stitching that have a reduced yaw, pitch or roll error may be captured, resulting in a higher quality panoramic image.

In some embodiments, the stitching module 209 sends the set of captured images along with the overlap information to the recognition server 101 for stitching a single linear panoramic image. In some embodiments, the stitching module 209 compares the extracted features of each individual image in the set of captured image to those features stored in an electronic database table for recognition. The stitching module 209 identifies for example, the products in the individual images and uses such information in combination with the overlap information for stitching the set of captured images together into a single linear panoramic image.

A system and method for an algorithm to estimate yaw error in camera pose and presentation of a yaw user interface has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   receiving, using one or more computing devices, a preview image of an object;
   performing, using the one or more computing devices, line detection on the preview image to detect a plurality of lines, the plurality of lines including a first line and a second line;
   determining, using the one or more computing devices, a first height between the first line and the second line at a first point in the preview image;
   determining using the one or more computing devices a second height between the first line and the second line at a second point in the preview image;
   computing, using the one or more computing devices, a line parameterization for the plurality of lines by calculating a first distance from a capture device point to the first point in the preview image, calculating a second distance from the capture device point to the second point in the preview image and determining one or more of start points end points and point and slope of the first line and the second line;
   calculating, using the one or more computing devices, a yaw angle using the line parameterization; and
   correcting, using the one or more computing devices, the preview image of the object using the yaw angle to adjust the preview image and remove a portion of an error introduced by the yaw angle.

2. The method of claim 1, wherein the first line and the second line are non-parallel.

3. The method of claim 1, further comprising:
   stitching, using the one or more computing devices, the adjusted preview image into a plurality of previously captured images to create a linear panoramic image of the object.

4. The method of claim 1, wherein correcting the preview image of the object using the yaw angle includes presenting, using the one or more computing devices, an indicator representing the yaw angle in a user interface on a display device.

5. The method of claim 4, wherein the indicator representing the yaw angle is a vertical eyelid indicator, the method further comprising:
   computing, using the one or more computing devices, a pitch angle and a roll angle for the preview image;
   determining, using the one or more computing devices, the vertical eyelid indicator based on the yaw angle;
   determining, using the one or more computing devices, a horizontal eyelid indicator based on the pitch angle;
   determining, using the one or more computing devices, a ball indicator based on the roll angle;
   presenting, using the one or more computing devices, the vertical eyelid indicator over a portion of an inner area of a smaller concentric circle centered on the display device;
   presenting, using the one or more computing devices, the horizontal eyelid indicator over a portion of an inner area of a larger concentric circle centered on the display device; and
   presenting, using the one or more computing devices, the ball indicator along an outside edge of the larger concentric circle centered on the display device.

6. The method of claim 1, further comprising:
   determining, using the one or more computing devices, a vanishing point using the line parameterization of the first line and the second line.

7. A system comprising:
   a processor; and
   a memory storing instructions that, when executed, cause the system to:
   receive a preview image of an object;
   perform line detection on the preview image to detect a plurality of lines the plurality of lines including a first line and a second line;
   determine a first height between the first line and the second line at a first point in the preview image;
   determine a second height between the first line and the second line at a second point in the preview image;
   compute a line parameterization for the plurality of lines by calculating a first distance from a capture device to the first point in the preview image, calculating a second distance from the capture device to the second point in the preview image, and determining one or more of start points, end points and point and slope of the first line and the second line;
   calculate a yaw angle using the line parameterization; and correct the preview image of the object using the yaw angle to adjust the preview image and remove a portion of an error introduced by the yaw angle.

8. The system of claim 7, wherein the first line and the second line are non-parallel.

9. The system of claim 7, wherein the instructions that, when executed, further cause the system to:
stitch the adjusted preview image into a plurality of previously captured images to create a linear panoramic image of the object.

10. The system of claim 7, wherein the instructions that, when executed, cause the system to correct the preview image of the object using the yaw angle includes instructions that, when executed, cause the system to present an indicator representing the yaw angle in a user interface on a display device.

11. The system of claim 10, wherein the indicator representing the yaw angle is a vertical eyelid indicator, and wherein the instructions that, when executed, further cause the system to:
compute a pitch angle and a roll angle for the preview image;
determine the vertical eyelid indicator based on the yaw angle;
determine a horizontal eyelid indicator based on the pitch angle;
determine a ball indicator based on the roll angle;
present the vertical eyelid indicator over a portion of an inner area of a smaller concentric circle centered on the display device;
present the horizontal eyelid indicator over a portion of an inner area of a larger concentric circle centered on the display device; and
present the ball indicator along an outside edge of the larger concentric circle centered on the display device.

12. A computer program product comprising a non-transitory computer useable medium including a computer readable program, wherein the computer readable program when executed on a computer cause the computer to:
receive a preview image of an object;
perform line detection on the preview image to detect a plurality of lines, the plurality of lines including a first line and a second line;
determine a first height between the first line and the second line at a first point in the preview image;
determine a second height between the first line and the second line at a second point in the preview image;
compute a line parameterization for the plurality of lines by calculating a first distance from a capture device point to the first point in the preview image, calculating a second distance from the capture device point to the second point in the preview image, and determining one or more of start points, end points, and point and slope of the first line and the second line;
calculate a yaw angle using the line parameterization; and
correct the preview image of the object using the yaw angle to adjust the preview image and remove a portion of an error introduced by the yaw angle.

13. The computer program product of claim 12, wherein the first line and the second line are non-parallel.

14. The computer program product of claim 12, wherein the computer readable program when executed on a computer causes the computer to correct the preview image of the object using the yaw angle and further causes the computer to present an indicator representing the yaw angle in a user interface on a display device.

15. The computer program product of claim 14, wherein the computer readable program when executed on a computer to further cause the computer to present the indicator representing the yaw angle is a vertical eyelid indicator further cause the computer to:
compute a pitch angle and a roll angle for the preview image;
determine the vertical eyelid indicator based on the yaw angle;
determine a horizontal eyelid indicator based on the pitch angle;
determine a ball indicator based on the roll angle;
present the vertical eyelid indicator over a portion of an inner area of a smaller concentric circle centered on the display device;
present the horizontal eyelid indicator over a portion of an inner area of a larger concentric circle centered on the display device; and
present the ball indicator along an outside edge of the larger concentric circle centered on the display device.

16. The method of claim 1, further comprising:
determining a vanishing point using the line parameterization of the first line and the second line.

17. The computer program product of claim 12, wherein the computer readable program when executed on a computer causes the computer to determine a vanishing point using the line parameterization of the first line and the second line.

18. The computer program product of claim 12, wherein the computer readable program when executed on a computer causes the computer to stitch the adjusted preview image into a plurality of previously captured images to create a linear panoramic image of the object.

19. The system of claim 7, wherein the instructions that, when executed, further cause the system to determine a vanishing point using the line parameterization of the first line and the second line.

* * * * *